Figure 5:
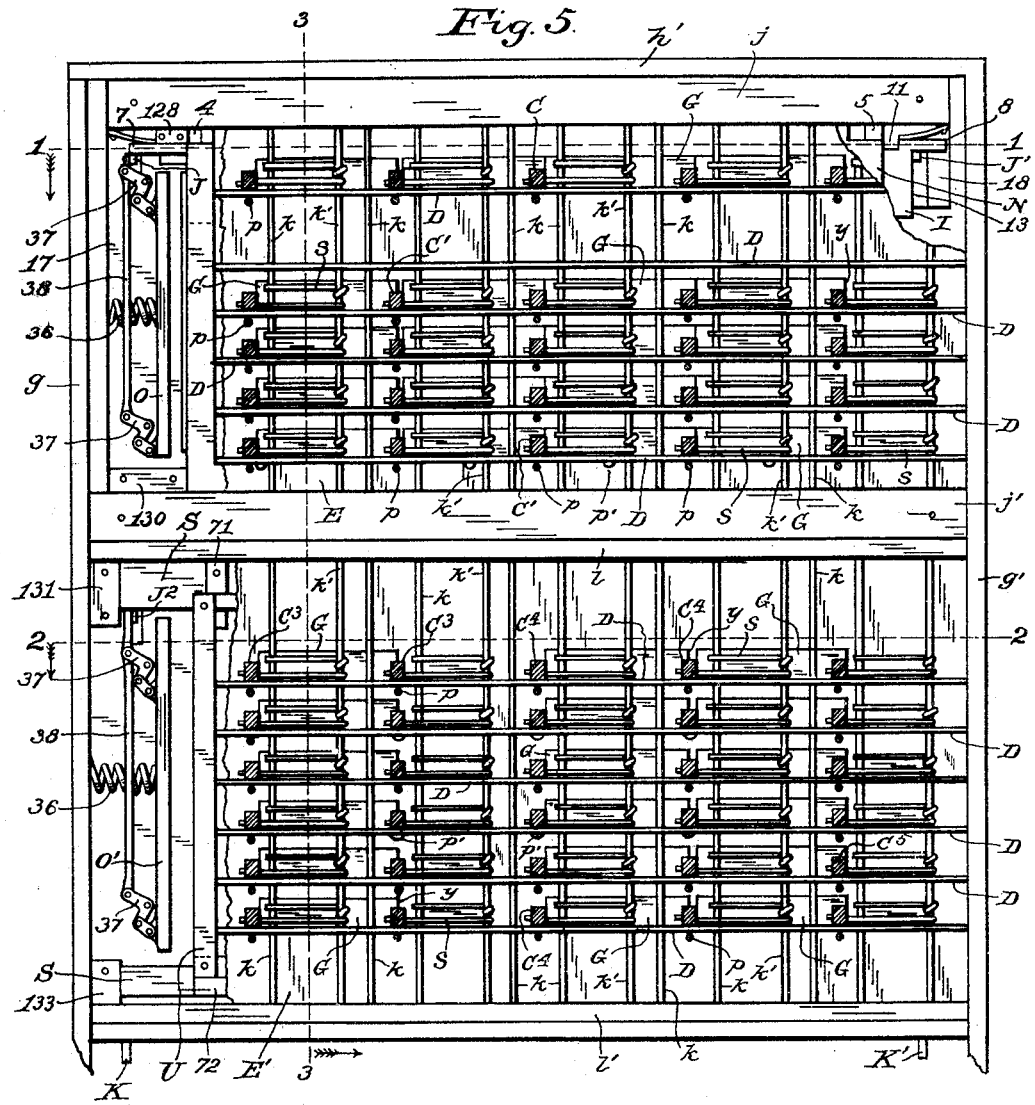

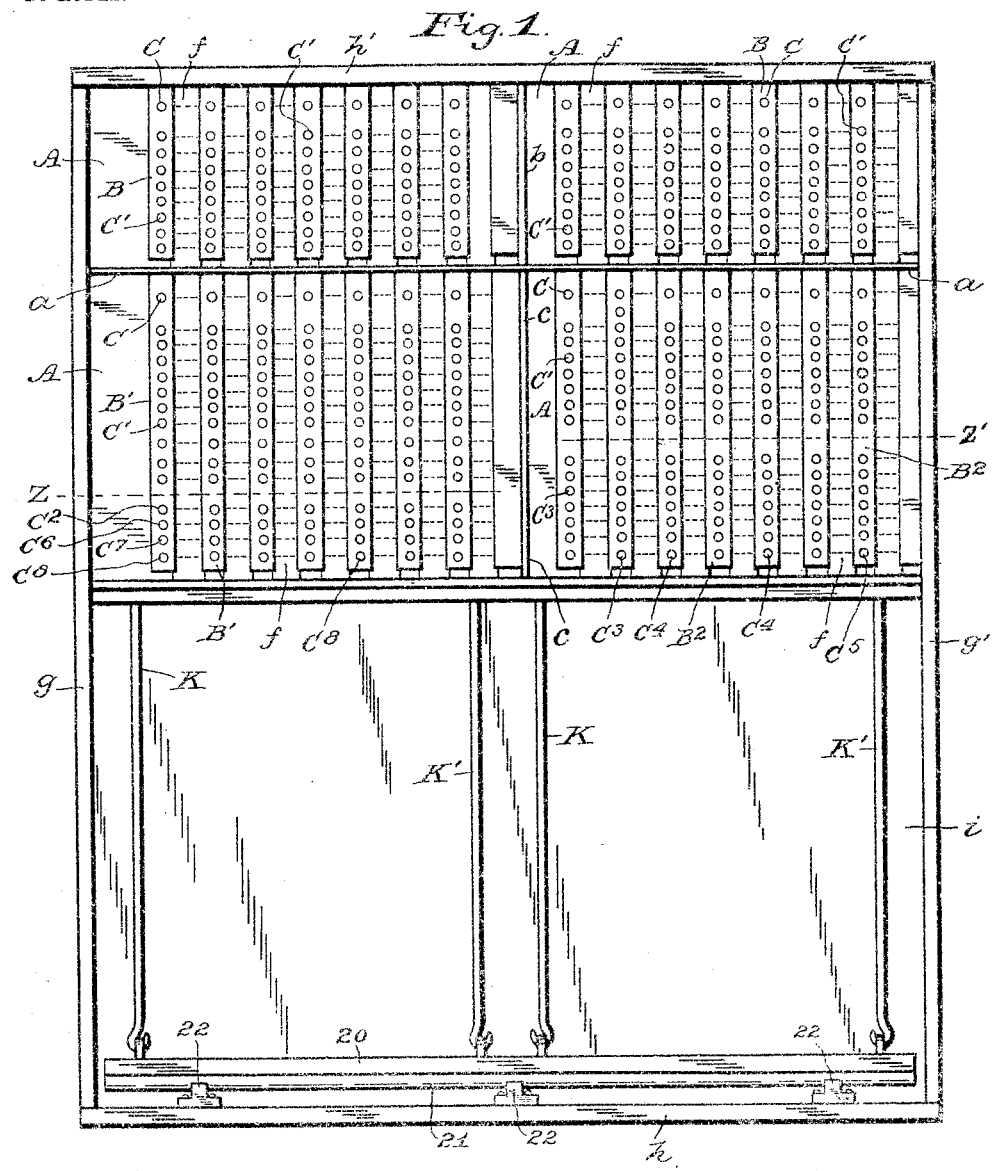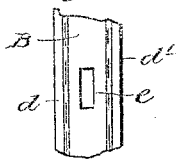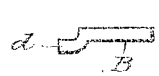

No. 776,729. PATENTED DEC. 6, 1904.
C. DE CROES.
VOTING MACHINE.
APPLICATION FILED NOV. 6, 1903.
NO MODEL. 15 SHEETS—SHEET 2.

Witnesses:
Wm H Payne
Stella Snider

Inventor:
Clement DeCroes,
By E. T. Silvius,
Attorney.

No. 776,729. PATENTED DEC. 6, 1904.
C. DE CROES.
VOTING MACHINE.
APPLICATION FILED NOV. 6, 1903.
NO MODEL. 15 SHEETS—SHEET 3.
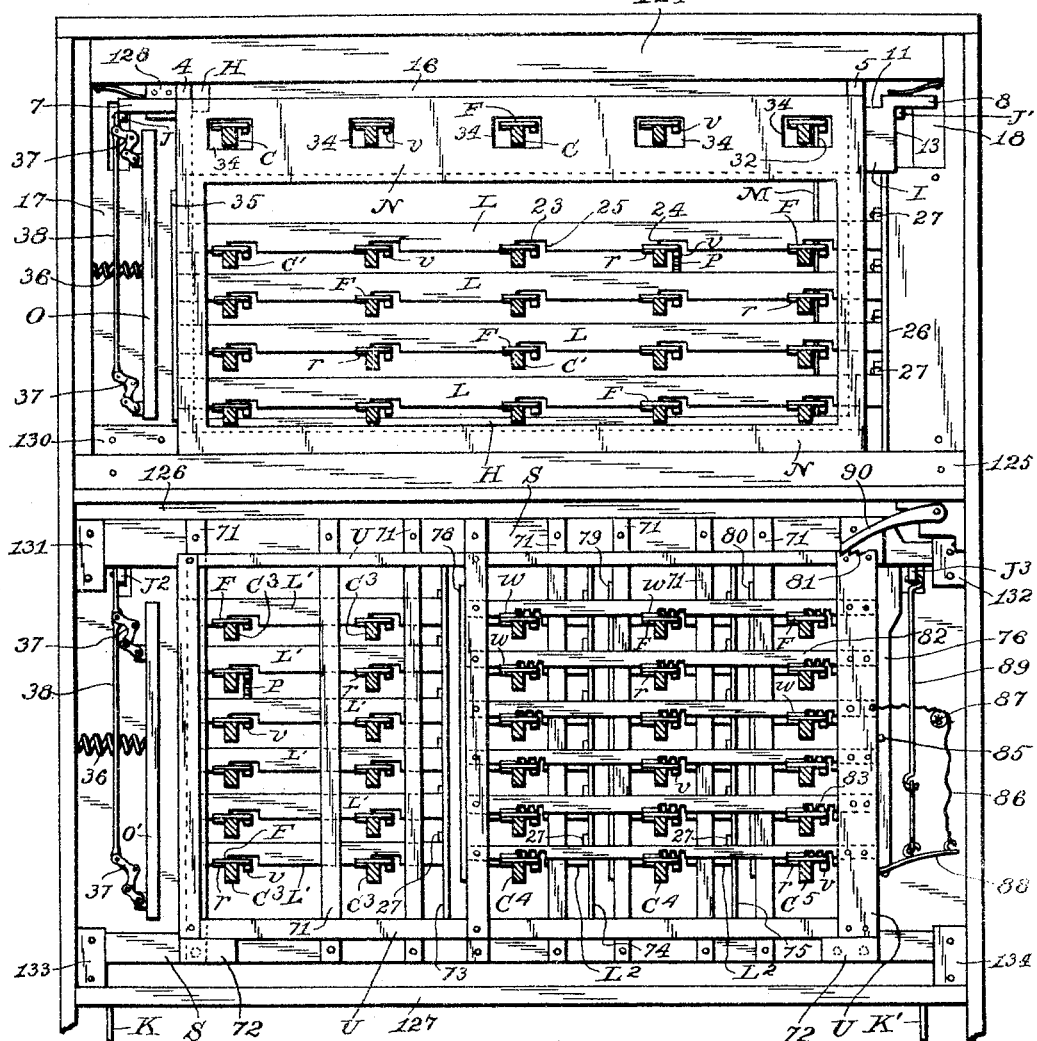
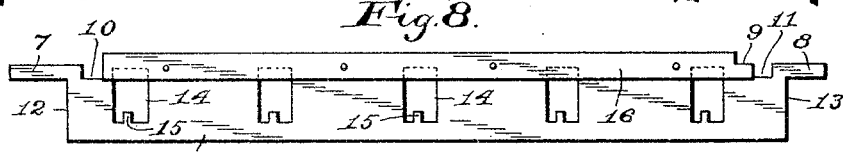
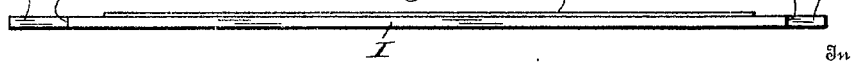
Witnesses:
Wm H Payne
Stella Snider
Inventor:
Clement DeCroes,
By E. T. Silvius.
Attorney.

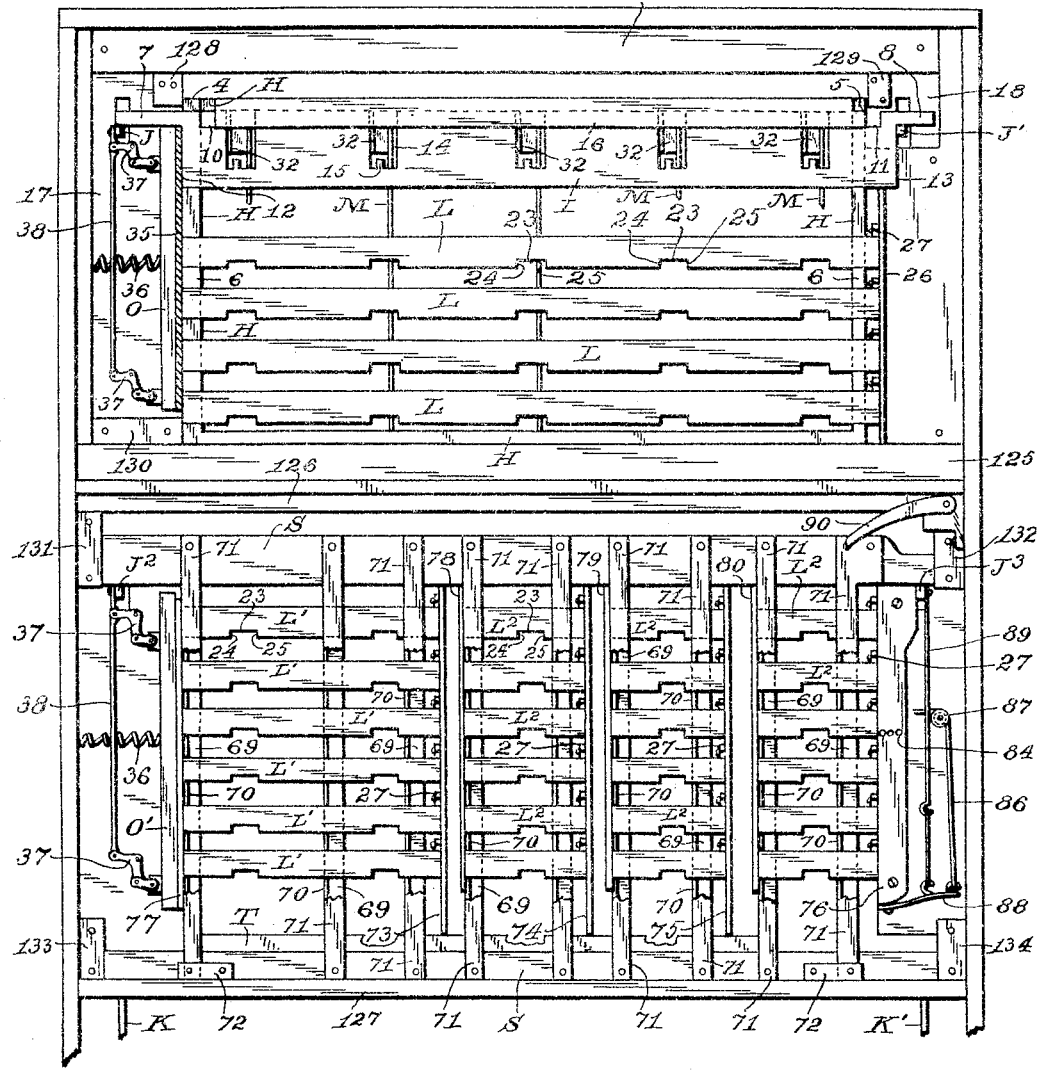

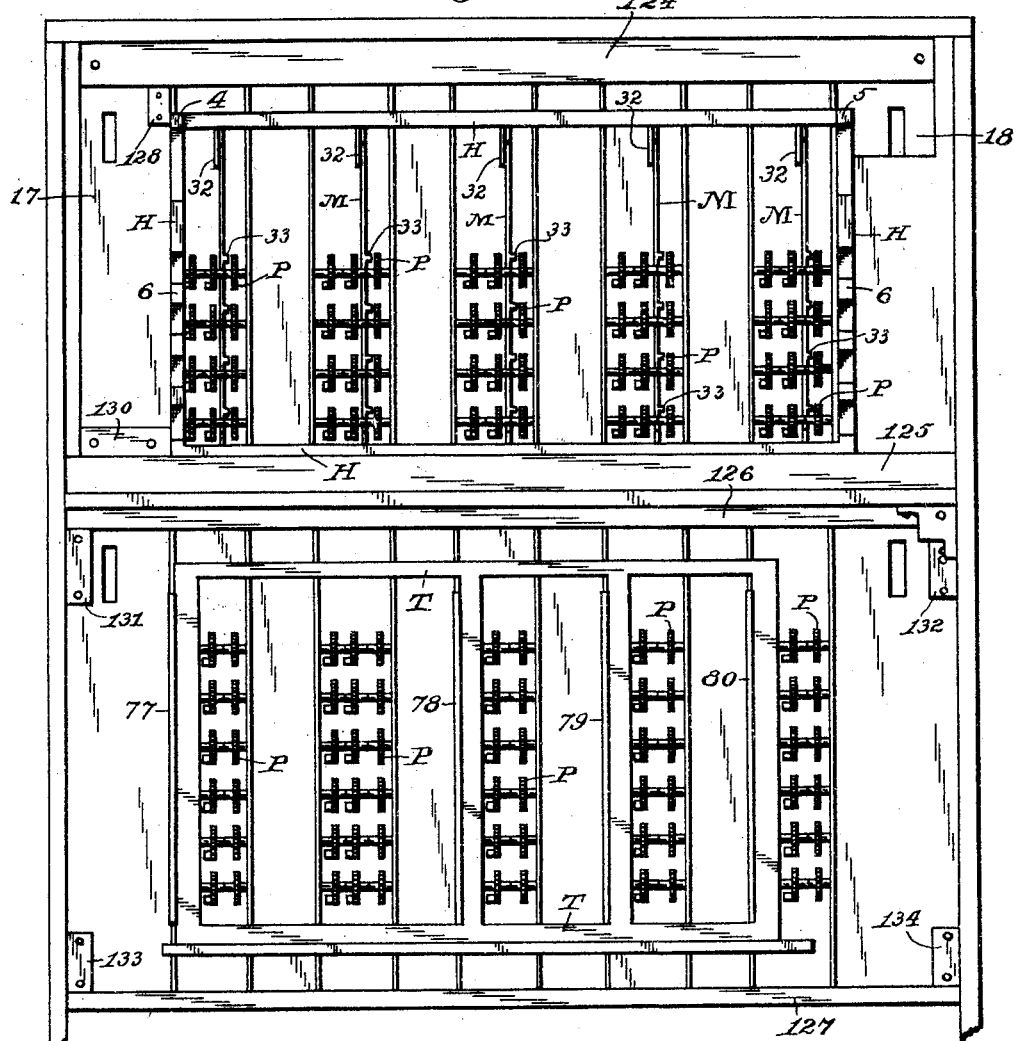

No. 776,729. PATENTED DEC. 6, 1904.
C. DE CROES.
VOTING MACHINE.
APPLICATION FILED NOV. 6, 1903.
NO MODEL. 15 SHEETS—SHEET 7.

Witnesses:
Wm H Payne
Stella Snider

Inventor:
Clement DeCroes,
By E. T. Silvius,
Attorney.

No. 776,729. PATENTED DEC. 6, 1904.
C. DE CROES.
VOTING MACHINE.
APPLICATION FILED NOV. 6, 1903.
NO MODEL. 15 SHEETS—SHEET 8.

Witnesses:
Wm H Payne
Stella Snider

Inventor:
Clement DeCroes,
By E. T. Silvius,
Attorney.

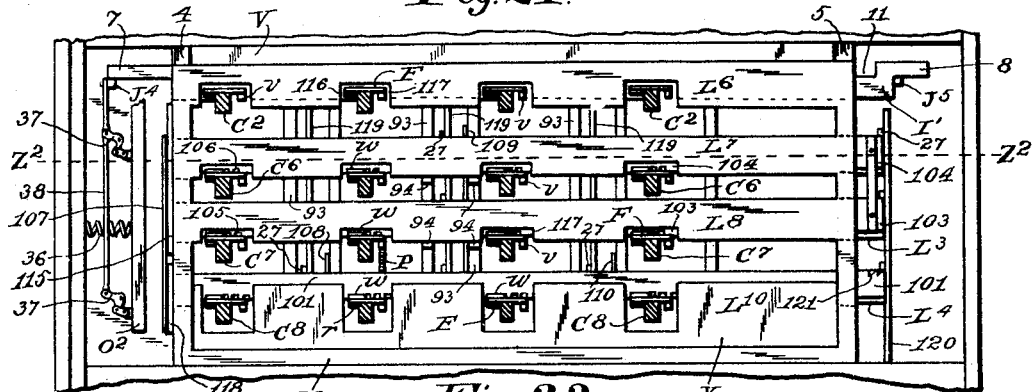
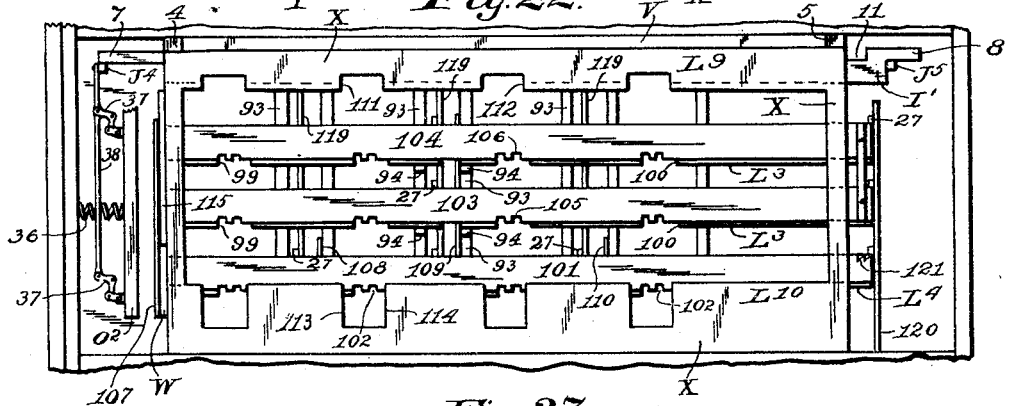
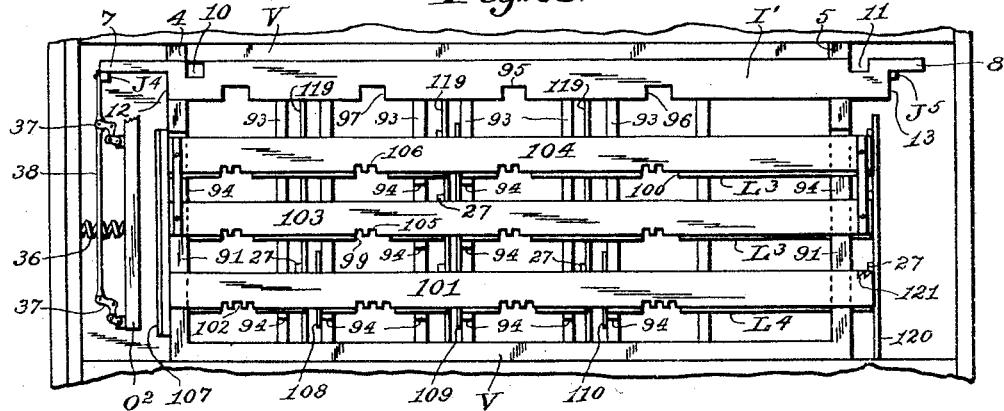

No. 776,729. PATENTED DEC. 6, 1904.
C. DE CROES.
VOTING MACHINE.
APPLICATION FILED NOV. 6, 1903.
NO MODEL. 15 SHEETS—SHEET 10.

Witnesses:
Wm H Payne
Stella Snider

Inventor:
Clement DeCroes,
By E. T. Silvius.
Attorney.

No. 776,729. PATENTED DEC. 6, 1904.
C. DE CROES.
VOTING MACHINE.
APPLICATION FILED NOV. 6, 1903.
NO MODEL. 15 SHEETS—SHEET 11.
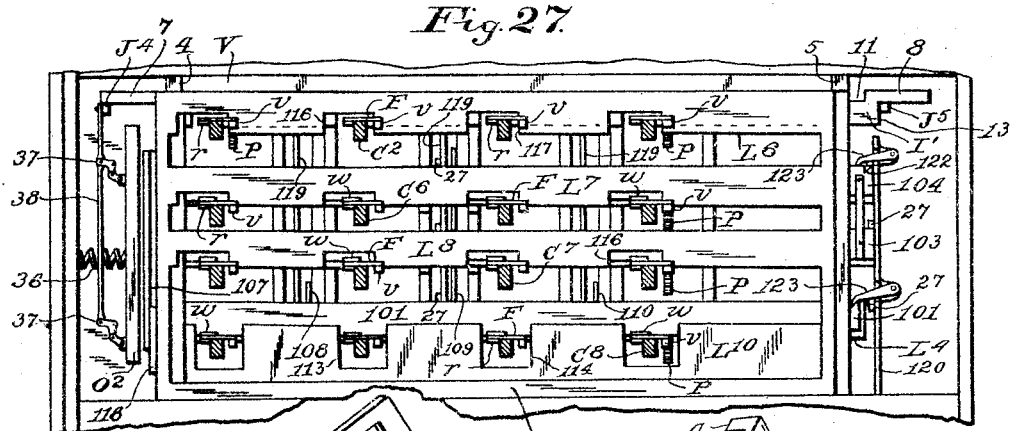
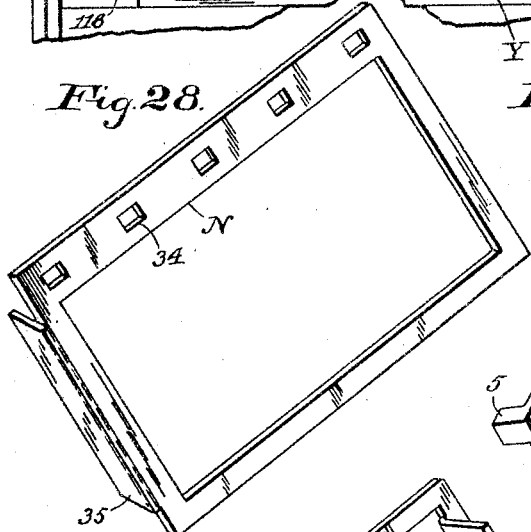
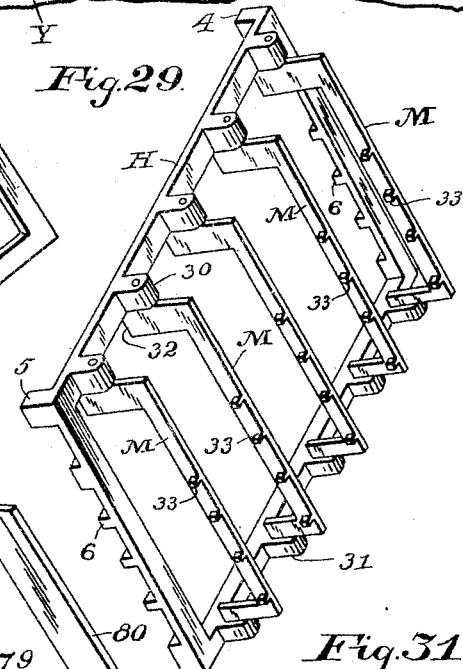
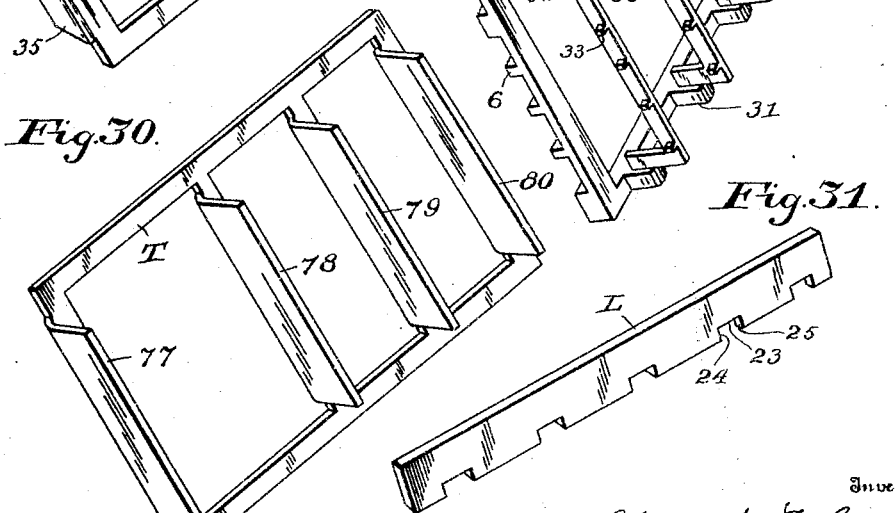
Witnesses: Wm H Payne, Stella Snider
Inventor: Clement DeCroes,
By E. T. Silvius, Attorney.

No. 776,729. PATENTED DEC. 6, 1904.
C. DE CROES.
VOTING MACHINE.
APPLICATION FILED NOV. 6, 1903.
NO MODEL. 15 SHEETS—SHEET 12.
Fig. 32.
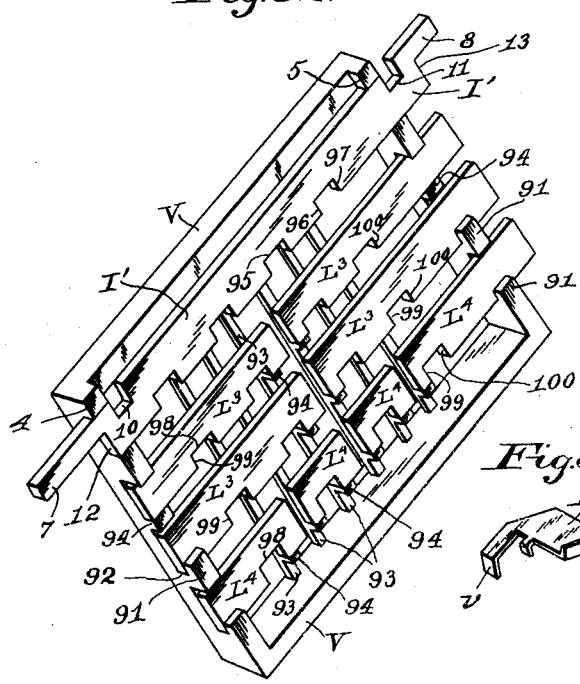
Fig. 33.
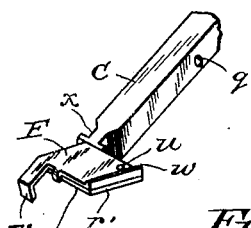
Fig. 35.
Fig. 34.
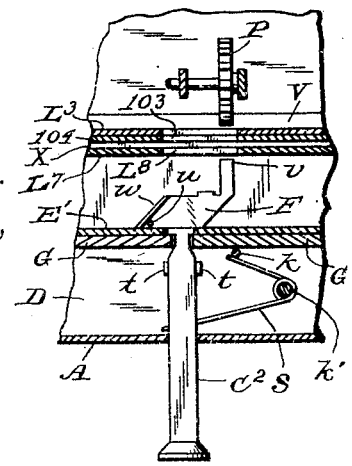
Fig. 36.
Fig. 37.
Fig. 38.
Witnesses:
Wm H Payne
Stella Snider.
Inventor:
Clement DeCroes,
By
E. D. Silvius.
Attorney.

No. 776,729. PATENTED DEC. 6, 1904.
C. DE CROES.
VOTING MACHINE.
APPLICATION FILED NOV. 6, 1903.
NO MODEL. 15 SHEETS—SHEET 13.
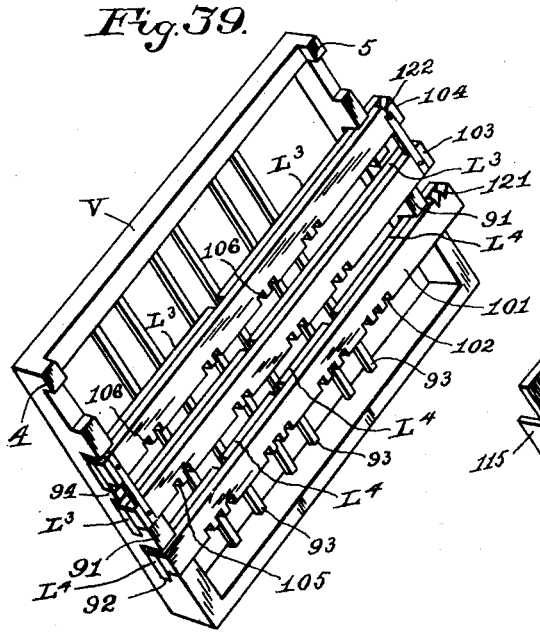
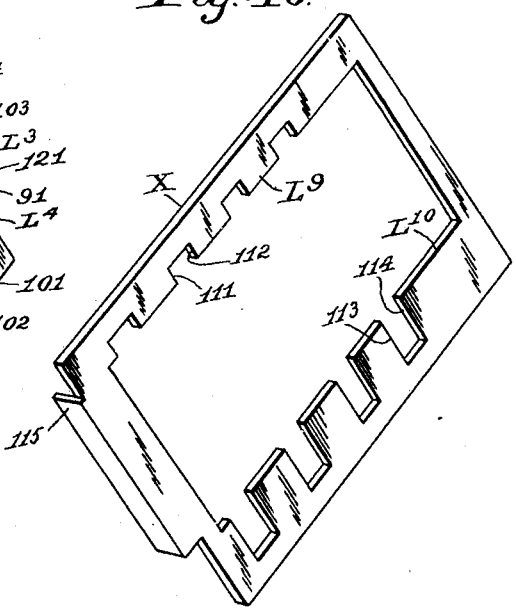
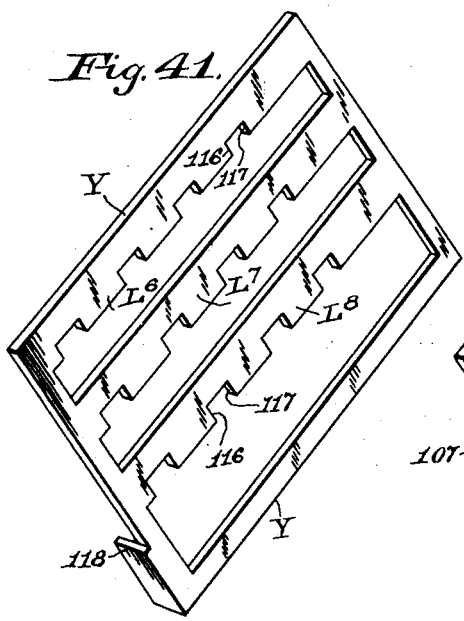
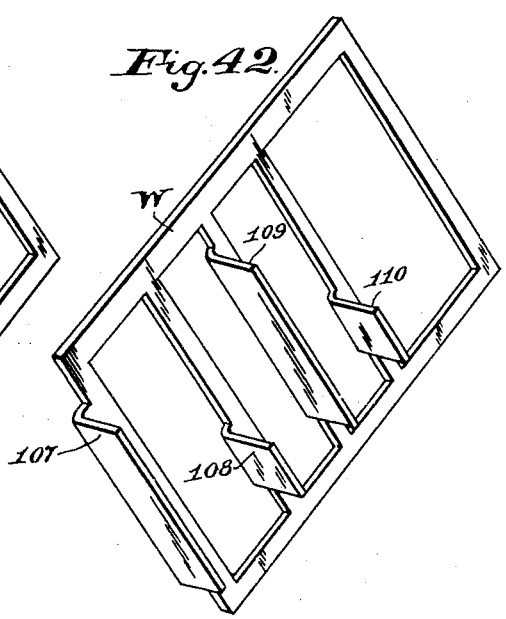
Witnesses:
Wm H Payne
Stella Snider
Inventor:
Clement DeCroes,
By E.D. Silvius,
Attorney.

No. 776,729. PATENTED DEC. 6, 1904.
C. DE CROES.
VOTING MACHINE.
APPLICATION FILED NOV. 6, 1903.
NO MODEL. 15 SHEETS—SHEET 14.
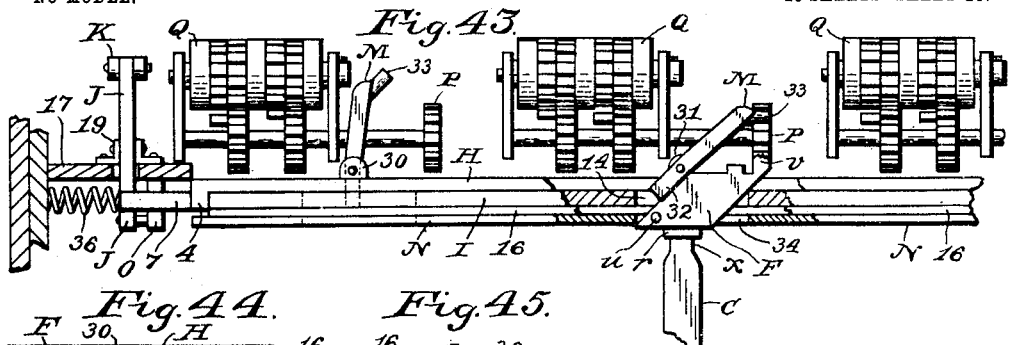
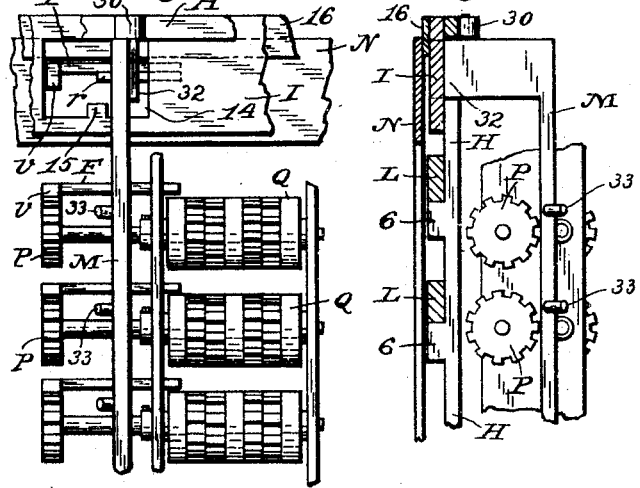
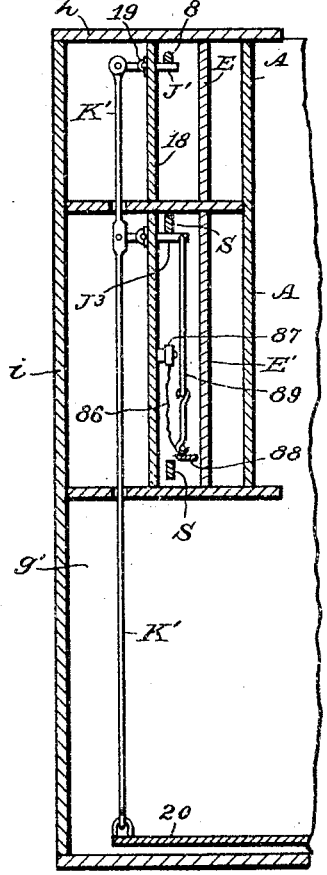
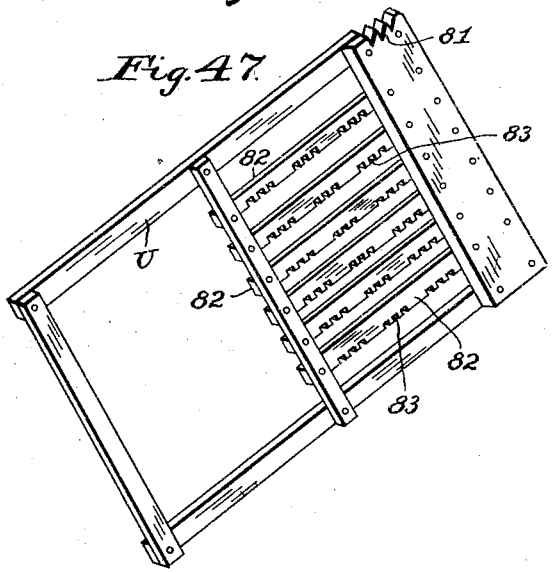
Witnesses:
Wm. H. Payne
Stella Snider
Inventor:
Clement DeCroes,
By E. T. Silvius,
Attorney.

No. 776,729. PATENTED DEC. 6, 1904.
C. DE CROES.
VOTING MACHINE.
APPLICATION FILED NOV. 6, 1903.
NO MODEL. 15 SHEETS—SHEET 15.

Witnesses:
Wm H Payne
Stella Snider

Inventor:
Clement DeCroes,
By E. T. Silvius.
Attorney.

No. 776,729.                                                   Patented December 6, 1904.

UNITED STATES PATENT OFFICE.

CLEMENT DE CROES, OF WESTPORT, INDIANA, ASSIGNOR TO THE HOOSIER VOTING MACHINE COMPANY, OF SHELBYVILLE, INDIANA, A CORPORATION OF INDIANA.

VOTING-MACHINE.

SPECIFICATION forming part of Letters Patent No. 776,729, dated December 6, 1904.

Application filed November 6, 1903. Serial No. 180,054. (No model.)

*To all whom it may concern:*

Be it known that I, CLEMENT DE CROES, a citizen of the United States, residing at Westport, in the county of Decatur and State of Indiana, have invented new and useful Improvements in Voting-Machines; and I do declare the following to be a full, clear, and exact description of the invention, reference being had to the accompanying drawings, and to the letters and figures of reference marked thereon, which form a part of this specification.

This invention relates to new and useful improvements in voting-machines generally, and particularly to improvements in my invention for voting-machines illustrated in reissued Letters Patent No. 11,933, dated September 24, 1901, original No. 594,986, dated December 7, 1897, the improvements having reference particularly to the keys for operating the vote registering or recording devices, to apparatus for coördinate voting, and to apparatus whereby certain candidates may be given votes in excess of one vote by each voter.

The invention also has particular reference to the lock-out mechanism whereby the operating-keys are locked out or prevented from forming contacts with the registers, and it has reference also to various minor details of construction, as will hereinafter appear.

The main object of the invention is to so improve my said former invention as to render the machine as a whole complete, and thereby perfectly fulfil the requirements of the times in voting-machines. Further objects are to provide devices and mechanisms in voting-machine construction which may be cheaply produced and reproduced by means of machinery and that will prove reliable and durable in use.

The invention consists in a voting-machine provided with improved apparatus for voting straight party-tickets, mechanism whereby minority candidates may be given larger counts than majority candidates, and improved mechanism for coördinate voting.

The invention consists also in the novel parts and in the novel combination and arrangement of parts, as hereinafter particularly described and claimed.

Figure 6:
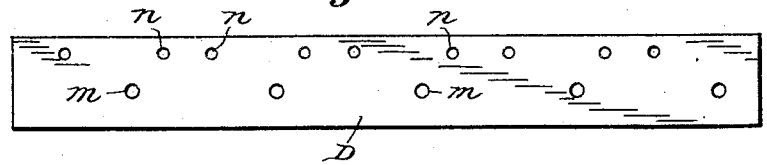
Figure 16:
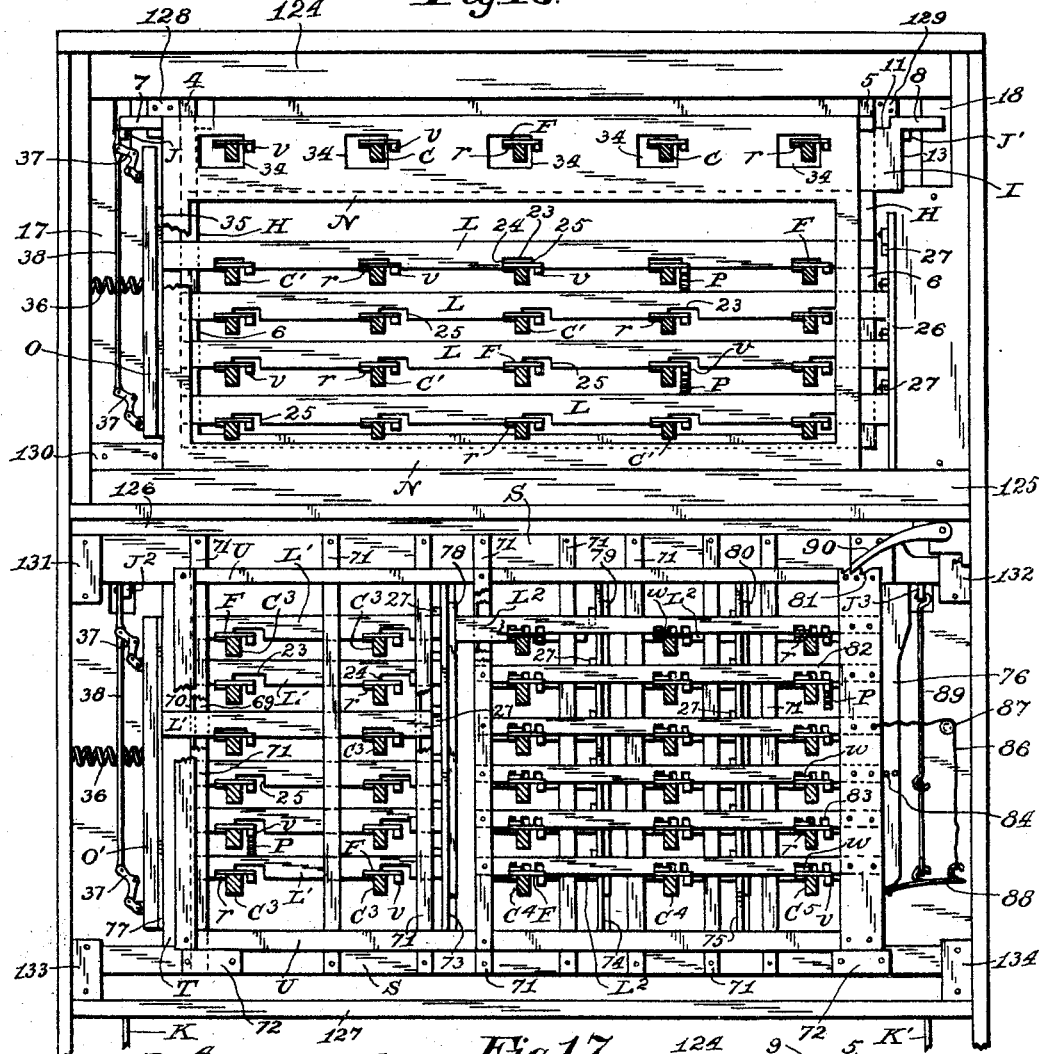
Figure 17:
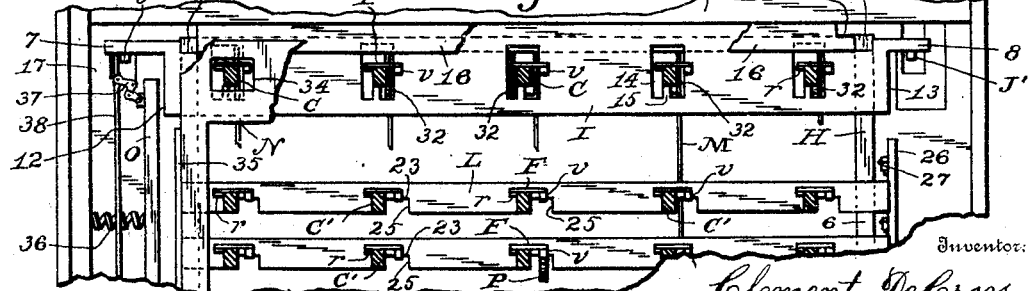
Figure 18:
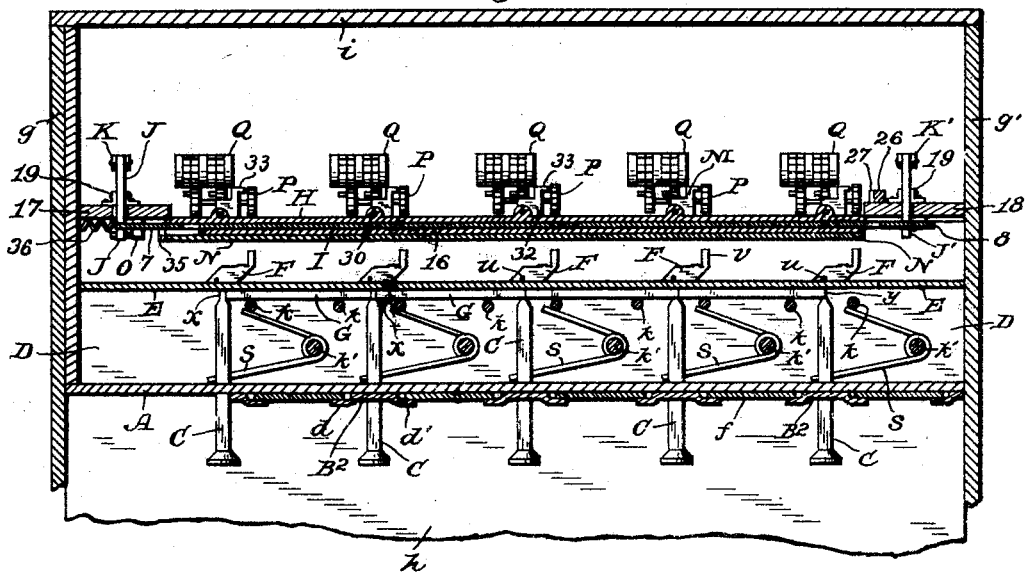
Figure 19:
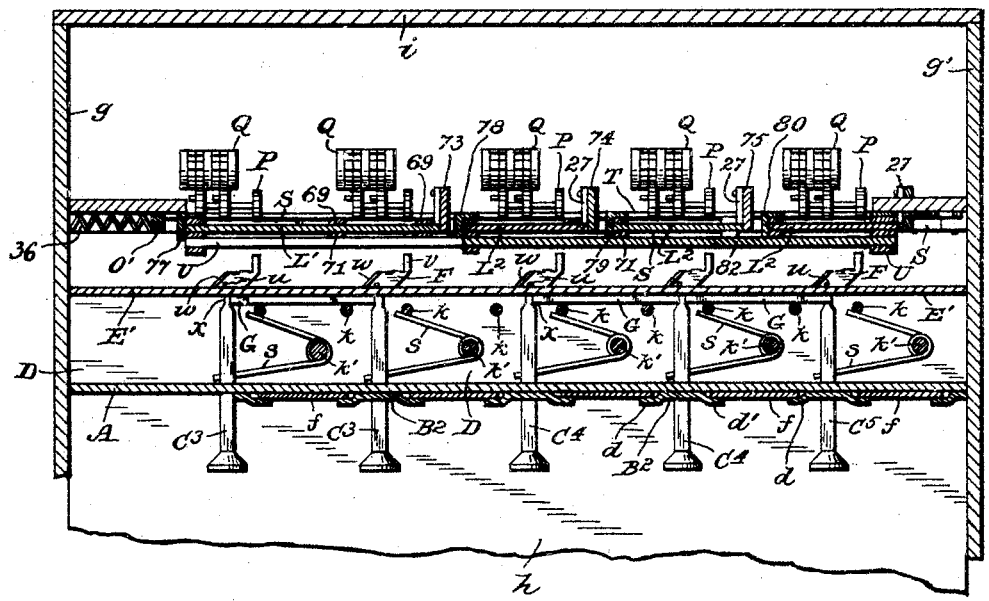
Figure 20:
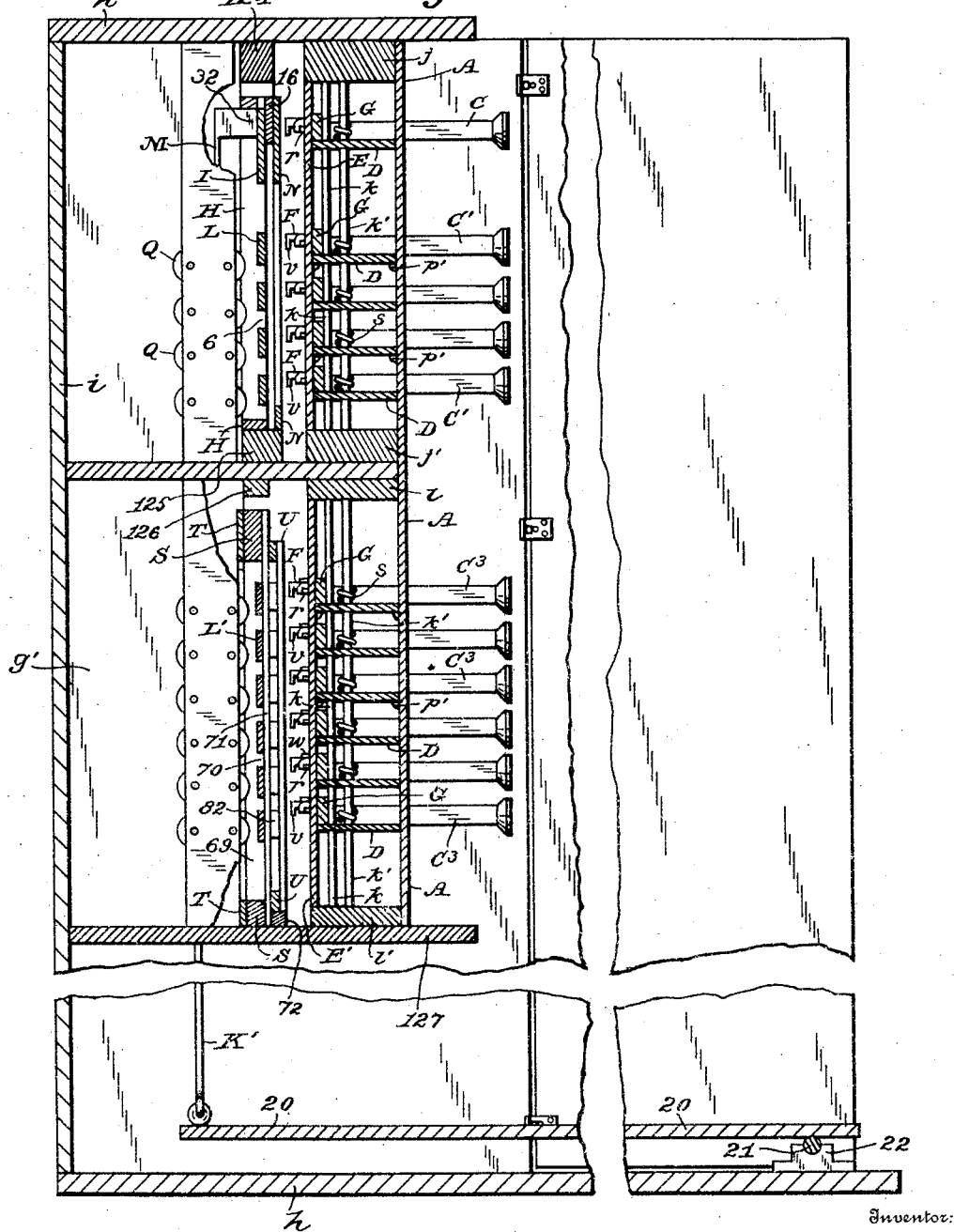
Figure 24:
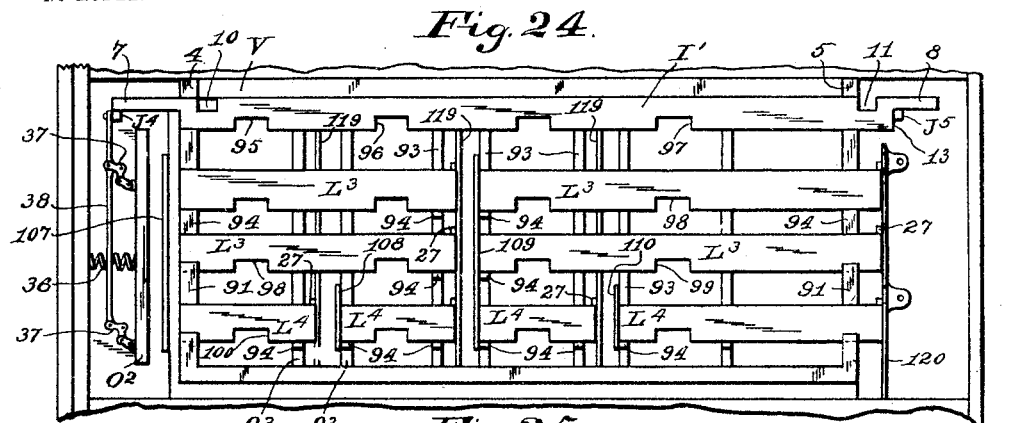
Figure 25:
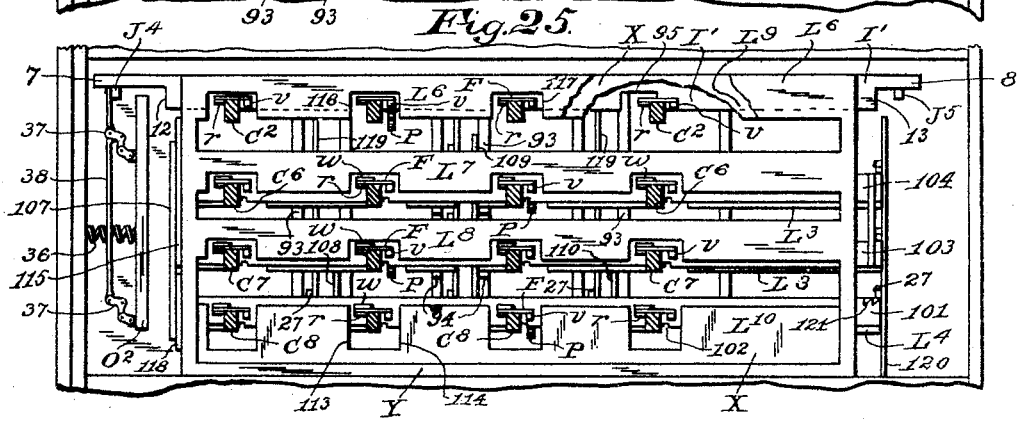
Figure 26:
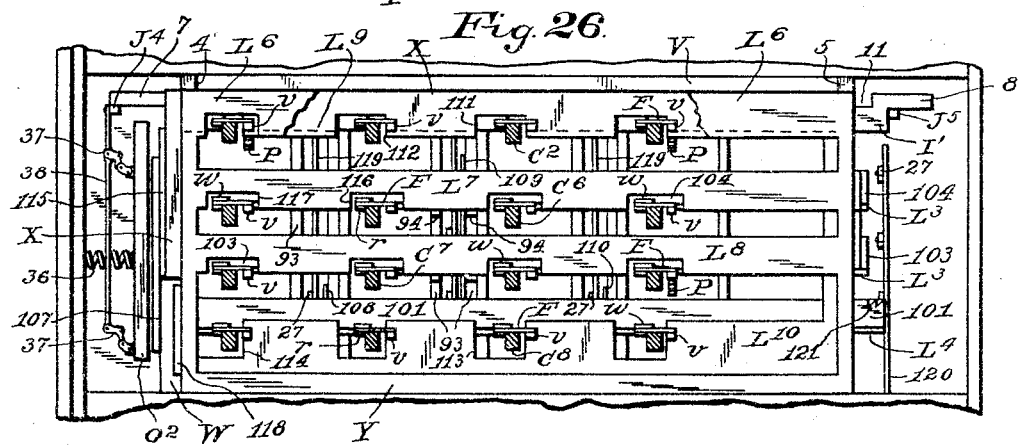
Figure 48:
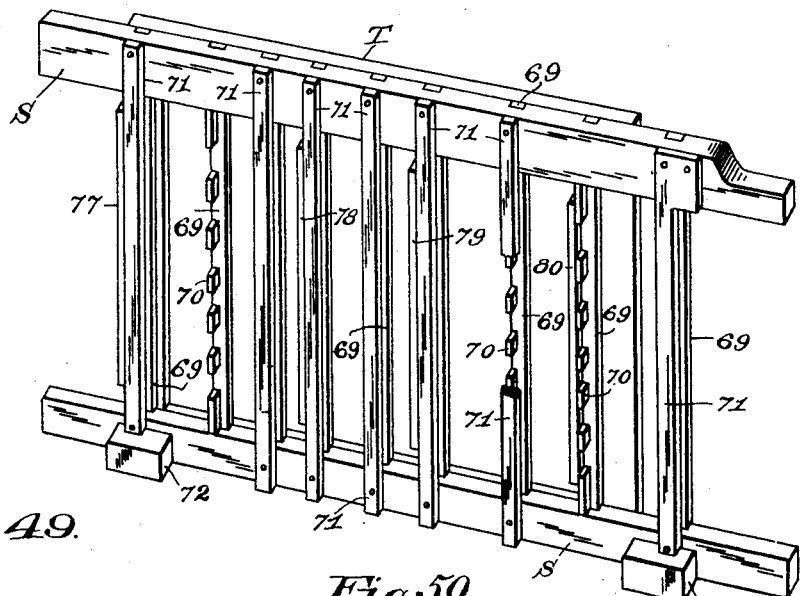
Figure 49:
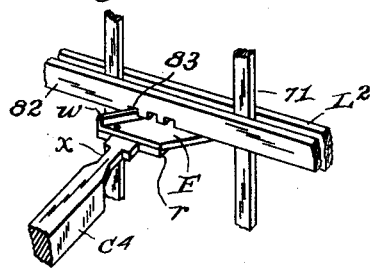
Figure 50:
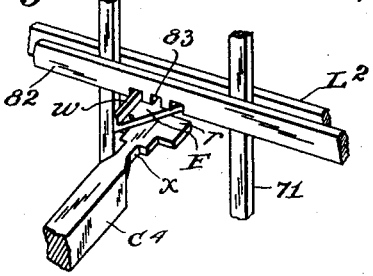
Figure 51:
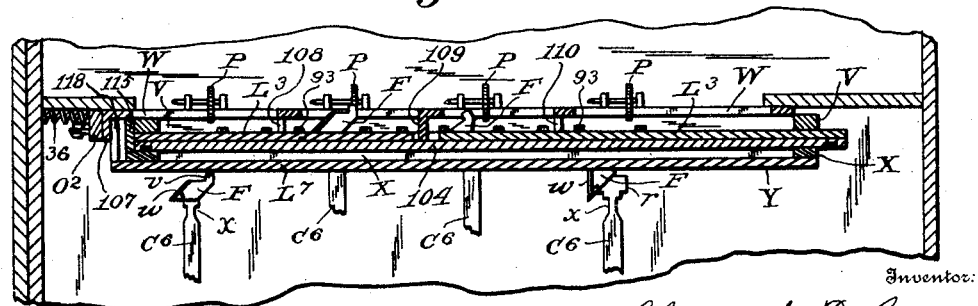

Referring to the drawings forming parts of this specification, in which similar reference characters indicate corresponding parts or features, Figure 1 represents a front elevation of a voting-machine constructed substantially in accordance with the invention, subject to modifications to suit the numbers and lengths of tickets that may be required. The front doors commonly employed are here omitted, the lower portion of the case being open and the platform whereby the machine may be put into working condition being shown in its operative position. Figs. 2, 3, and 4 are details of minor parts connected with the keyboard of the machine. Fig. 5 is a vertical sectional view on the plane at the rear of the keyboard, showing novel framework in elevation and also main limiting-bars whereby the simultaneous operation of two or more keys (and registers) affecting candidates for the same office is prevented, the figure illustrating the mechanism usually employed in the sections corresponding to the lower right-hand keyboard-section in Fig. 1. Fig. 6 is a plan of one of the numerous horizontal plates behind the keyboard whereby the limiting-bars are supported. Fig. 7 is a vertical sectional view in the plane at the rear of the partition employed behind the main limiting-bars for supporting the inner ends of the operating-keys, the complete improved lock-out mechanism being shown in front elevation, two sections of mechanism being shown corresponding to the sections illustrated in Fig. 5 and in operative positions. Fig. 8 is a front elevation, and Fig. 9 an inverted plan view, of the main operating-bar improved in details of construction. Fig. 10 is a front elevation similar to that shown in Fig. 7, but with parts omitted so that features of the lock-out mechanism may be the better understood, the mechanism being set "out of gear" or so that voting cannot take place. Figs. 11 and 12 are fragmentary detail views amplifying the illustrations of the latches for the lock-out bars. Fig. 13 is a front elevation of the parts that are arranged at the rear of those shown at the front in Fig. 10, showing portions of registers to indicate their relative positions and also showing a multiple register-operating device whereby when a key at the head of a ticket is operated the votes for all the candidates on the ticket will be registered. Fig. 14 is a front elevation of a train of the main limiting-bars, showing operating-keys in transverse section with relation thereto, and Fig. 15 is a horizontal sectional view of the bars on a plane on top of the keys, illustrating the manner and means by which the operation of the keys in each horizontal row representing a candidate or office is limited to one key to prevent tampering. Fig. 16 is a view similar to Fig. 7, with the difference in the positions of certain lock-out members resulting from the operations of certain operating-keys. Fig. 17 is a fragmentary reproduction of the upper portion of Fig. 16, showing the manner in which all the remaining operating-keys are locked out after a straight ticket has been voted. Fig. 18 is a horizontal sectional view on the plane of the broken line 1 1 in Fig. 5, showing the operating-keys and lock-out bars with relation to the registers. Fig. 19 is a horizontal sectional view on the plane of the line 2 2 in Fig. 5, showing portions of the lock-out mechanism for the coördinate-voting section. Fig. 20 is a vertical transverse sectional view on the plane of the line 3 3 in Fig. 5, showing the arrangement of the keys for the party-ticket-voting mechanism and also showing the coördinate-voting apparatus in relation to the registers. Fig. 21 is an elevation of the lock-out mechanism for the operating-keys employed for multiplying votes and is intended to be arranged at the lower ends of the State tickets corresponding to the bottom of the lower left-hand section of the keyboard in Fig. 1, the mechanism being set "in gear" or so that voting may take place. Fig. 22 is a view similar to that in Fig. 21, but with the forward lock-out member omitted in order to clearly show the remaining devices. Fig 23 is a view similar to that in Fig. 22, but with the front lock-out member thereon omitted in order to clearly show the limiting-bars whereby the count may be limited to three votes per voter. Fig. 24 is a view similar to that in Fig. 23, but with the limiting-bars omitted to clearly show the lock-out bars in operative positions. Fig. 25 is a view similar to that in Fig. 21, with the difference that the lock-out mechanism appears in the proper positions they would assume after one of the keys in the upper horizontal row may have been operated, thereby locking out all of the other keys. Fig. 26 is a view also similar to that in Fig. 21, with the difference that the mechanism appears as it would after the operation of two keys in the two middle horizontal rows. Fig. 27 is a view also similar to that in Fig. 21, with the difference that the mechanism appears as it would after the operation of two of the possible three keys that may be operated in the lower horizontal row. Fig. 28 is a perspective view of the lock-out bar (or plate) that is employed in locking out the straight-ticket keys when "scratch" voting is done. Fig. 29 is a rear perspective view of the carrier for lock-out mechanism for the party-tickets and the devices for operating the registers for all of the candidates on a ticket after voting a "straight" party-ticket. Fig. 30 is a perspective view of a multiple retractor that is operated by the main retractor for returning the lock-out bars in the coördinate mechanism horizontally to their normal positions after the voting operations. Fig. 31 is a perspective view of one of the longer independent lock-out bars, shorter bars designed to coöperate with but two or more operating-keys being formed in a similar manner, except as to the number of openings or recesses to permit passage of the keys. Fig. 32 is a perspective view of the carrier and the lock-out bars for the section designed to accommodate multiple voting, where a voter may give three votes to one candidate or one and one-half votes to each of two candidates or one vote to each of three candidates for the same office, the necessary limiting-bars being omitted in this figure in order to avoid obscuring the other parts. Fig. 33 is a perspective view of one of the improved operating-keys, the outer end of which is broken away; and Fig. 34 is a perspective view of the movable head that is mounted on and forms part of the head of the key. Fig. 35 is a fragmentary detail view illustrating the relative positions of the key-wheel or operating-wheel of the register, the operating-key, and the lock-out and limiting bars, the view being a horizontal section above the key which is in its normal position. Fig. 36 is a fragmentary vertical sectional detail view illustrating an operating-key in contact with the key-wheel of the register. Fig. 37 is a horizontal sectional detail view similar to Fig. 35, with the difference that the operating-key and its movable head appear in the positions they would assume when being disengaged from the key-wheel of the register, the key being about to retract to its normal position. Fig. 38 is an inverted perspective view of the improved operating-key, with the movable head omitted and the outer end broken away. Fig. 39 is a perspective view of the carrier shown in Fig. 32 and the limiting-bars and lock-out bars mounted thereon. Fig. 40 is a perspective view of a set of dual lock-out bars employed in the mechanism for multiple voting in connection with the apparatus shown in Fig. 39. Fig. 41 is a perspective view of a set of triple lock-out bars employed also in the mechanism for multiple voting in connection with the lock-out bars shown in Figs. 39 and 40. Fig. 42 is a perspective view of a multiple retractor that is operated by the main retractor for returning the lock-out bars shown particularly in Figs. 32, 39, 40, and 41 horizontally to their normal positions after the voting operations. Fig. 43 is a fragmentary horizontal sectional view showing a portion of the mechanism whereby straight party votes may be cast and registered. Fig. 44 is a fragmentary elevation view of parts in detail that are illustrated in Fig. 43. Fig. 45 is a fragmentary transverse vertical sectional view through the section shown in Fig. 43, showing parts of the mechanism for straight-ticket voting. Fig. 46 is a sectional diagrammatic view illustrating the train of apparatus for setting the lock-out mechanism into and out of gear. Fig. 47 is a perspective view of a set of multiple limiting-bars employed in connection with the section of the machine that is adapted for coördinate voting. Fig. 48 is a perspective view of the carrier for the lock-out bars employed in connection with the mechanism for coördinate voting, the multiple retractor illustrated in Fig. 30 being also shown in its operative relation therewith. Fig. 49 is a fragmentary perspective view illustrating the manner in which the operating-keys engage the limiting-bars while being operated to actuate the registers. Fig. 50 is a view similar to Fig. 49, but showing the key as it appears when being retracted after engagement with the register. Fig. 51 is a fragmentary horizontal sectional view as on the plane of the line $Z^2$ in Fig. 21 to illustrate the various relative positions assumed by the operating-keys with respect to the key-wheels of the registers and the lock-out mechanism.

In the drawings mechanisms will be found that are designed for casting several classes of ballots, viz: For party-tickets, either straight or mixed, for permitting each voter to cast three votes for the collective candidates for a certain office so distributed that one candidate may receive the whole three votes or two candidates may receive each one and one-half votes or three candidates may each receive one vote, at the option of the voter, for constitutional amendments and the like matters, where an affirmative and a negative vote may be required, the mechanism being also adapted for voting for candidates of two parties and for voting for a predetermined number of non-partisan candidates to be selected from a greater number that may have been nominated for one office, as a nonpartisan judge or members of a school-board.

In Fig. 1 the keyboard will serve to illustrate the arrangement of the tickets and the keys for voting for the various candidates for offices, and it is obvious that the keyboard and the necessary mechanisms may be extended to any desired extent, and the relative positions of the different tickets and voting mechanisms may be changed to suit requirements. Any suitable form of frame and case for the machine may be constructed, it being preferable that the whole apparatus be inclosed when not in use and that the keyboard be of suitable height so as to be in the range of vision of a standing voter. It is designed that the tickets be printed on separate slips of card or paper and secured against the front of the keyboard at the sides of the operating-keys, each slip to contain all of the candidates of a party. A horizontal bead $a$ divides the keyboard into upper and lower sections, and these are divided by vertical beads $b$ and $c$, so that four principal sections appear. The upper left-hand section is designed for national ballots particularly, as well as for others, the lower left-hand section for State tickets, in the lower part of which below the line Z the mechanism for multiple voting may be arranged to be set for use simultaneously with the other mechanisms, but constructed differently in some respects, the upper right-hand section for county ballots, and the lower right-hand section for any class of party-tickets and for coördinate or group voting, the mechanism for which, arranged below the line $Z'$, differs from the others in some respects.

Specifically, in construction the keyboard A is at the front of the machine proper, being vertical and suitably fixed in the frame of the machine so as to entirely obscure the registers and the lock-out mechanisms. The operating-keys extend through suitable openings in the keyboard. Suitable guides B B' $B^2$ extend vertically at the front of the keyboard and serve also as holders for the tickets, the guides preferably being composed of metal strips, each having raised lips $d$ $d'$ at their sides or a lip at either side, as required, and apertures $e$, through which the keys extend. The tickets $f$ may be inserted behind the lips and be suitably secured against tampering therewith, if desired. Of course the keyboard may be composed of strips and the guides form parts thereof.

The operating-keys C, arranged in horizontal rows, are arranged for use in voting straight party-tickets, the keys C' for voting mixed tickets or "scratching," the keys $C^2$ $C^6$ $C^7$ $C^8$, arranged in horizontal rows below the line Z, are intended for multiple voting in connection with State tickets, the keys $C^3$, arranged in two vertical rows below the line $Z'$, are for voting "yes" or "no," and the keys $C^4$ and $C^5$ operate in coördinate voting. The case has sides $g$ and $g'$, a bottom $h$, a top $h'$, and a back $i$.

For the purpose of illustrating the different types and modifications of lock-out mechanisms in detail they are arranged in the drawings in operative sections of suitable sizes, the first to be described being those that properly belong to the lower right-hand section of the keyboard and shown particularly in Figs. 5, 7, 10, 13, 16, 17, 18, 19, and 20, parts thereof appearing also in other figures.

At the rear of the keyboard A a suitable number of horizontal plates D are arranged and suitably secured, there being a plate under each horizontal row of operating-keys, as preferably constructed, and others may also be employed, if desired. The plates are in the nature of frame members and need not of necessity be solid plates. A partition E or E' is secured vertically at the rear of the plates D parallel to the keyboard A, and the inner end portions of the operating-keys are mounted in suitable openings in the partition so as to slide in the keyboard and in the partition. Frame-pieces $j$ $j'$ are provided in one of the sections, to which vertical rods $k$ and $k'$ are connected, and similar rods are connected to frame-pieces $l$ $l'$ in another section, (seen particularly in Figs. 5 and 20,) the rods extending through perforations $m$ and $n$ in the plates D. A suitable number of rods $p$ extend under the plates D transversely thereof for their support and are secured to the keyboard A and the partition E or E'. Also the plates may be partially supported by means of projections $p'$, attached to the keyboard and the partition under the plates D.

The improved operating-keys used throughout the machine are designed, as above stated, to move longitudinally of their axes, and all are substantially like the key C. In each standard key-body is a perforation $q$ to receive an arm of a retracting-spring. Each operating-key has a relatively fixed head $r$, having an inclined side face $r'$, designed to engage the lockout-bars, although such engagement may be made solely by the movable head F, with which each key is provided. The keys are provided each with a retracting-spring $s$, which extends about a rod $k'$, one arm of the spring engaging a rod $k$ and the other arm thereof entering the perforation $q$ in the key. In some cases lateral guides $t$ for the keys may be attached to the tops of the plates D. The movable heads F are connected to the heads $r$ by means of pivots $u$, situated near the part of the head $r$ that normally rests against the partition E or E', being at the left-hand side of the longitudinal axis of the key. Each head F has a finger $v$, having the extremity thereof turned downwardly beyond the head $r$, and certain heads F also are provided each with a fin $w$ at the top thereof immediately above the inclined side $r'$ of the head $r$. Normally the head F rests upon the head $r$, so that the fin $w$ extends in the same angle of inclination as that of the side $r'$ and cannot be changed in position except in the direction that will carry the finger $v$ beyond the inner end of the head $r$. Each operating-key has a recess $x$ in each side of the body thereof near the head $r$, although a recess in one side only is sufficient in some of the keys. The keys may be provided with suitable finger-knobs and suitable stop, as will be obvious.

In order to insure against the possibility of two or more keys in the same horizontal row being simultaneously operated, main limiting-bars G are provided in all sections of the machine, which operate independently of the lock-out mechanism, whereby other keys in a horizontal row are prevented from being operated after one of the number may have been operated. The bars G are formed as thin plates of suitable widths and are placed on edge against the partition E or E' behind the rods $k$ between the bodies of the operating-keys, each bar being of suitable length to equal the distance from the body of one key to the bottom of the recess $x$ in an adjacent key-body. Each bar has a projection $y$ at one end thereof extending above the adjacent key-body. Referring to Figs. 14 and 15, it will be seen that when the projection $y$ does not engage the end of the adjacent bar the key-body between the two bars may enter the opening between the ends of the bars, and when the projection $y$ is in engagement with the adjacent end of the nearest other bar the key-body between such two bars cannot enter further than the point having the recess therein, the bars in such case being held by another key that may be in operation, the bars being capable of movement endwise, so that any one of the keys may be operated at a time.

Each section that is designed to be employed in voting for party-tickets is arranged so that a complete ticket may be voted by the operation of one key. In this section the mechanism comprises a carrier H, which is situated behind the partition E or E' slightly beyond the inner ends of the operating-keys, lock-out bars L, mounted on the carrier for the individual-office keys, and a lock-out bar N for the ticket-head keys or those for voting straight tickets, also a combined main operating-bar and lock-out bar I, which supports the carrier.

The carrier H is formed as an open rectangular frame, and it is provided at its upper corners with projections 4 and 5, extending forwardly. The vertical end bars of the frame are provided with forwardly-extending projections 6.

The main operating-bar I, which also performs the functions of locking out the keys for the heads of the party-tickets, has arms 7 and 8 at its ends, and at or near the top thereof is a bearing 9, the top having recesses 10 and 11 so spaced apart that the projections 4 and 5 may fit therein. Below the arms 7 and 8 are shoulders 12 and 13, which may serve to engage stops. Suitably spaced along the bar are a suitable number of apertures 14, one to each key C employed. In each aperture is a projection 15, extending from the bottom of the aperture upwardly. A hood 16 is attached to the front of the bar H and extends partially over the apertures 14 from the tops thereof.

Suitable supports, as 17 and 18, are provided at the sides of the section and have pivoting brackets 19 attached thereto, in which are mounted levers J J', pivoted between their ends, and the bar I rests upon the forward ends of the levers and may slide somewhat thereon. The projections 4 and 5 normally rest on the top of the bar I, or, specifically, on the arm 7 and bearing 9 thereof, so that the levers J J' support the bar I and the latter supports the carrier H. To the rear ends of the levers J J' are connected links K K', extending to the lower portion of the machine-case for operating the levers. A treadle 20 is connected at its rear side to the links, so that the treadle may swing upward in the case when not in use. The forward part of the treadle is provided with a pivot-bar 21, which rests on pivot-blocks 22 on the bottom $h$ of the case when the treadle is in operative position horizontally. It will be obvious, however, that other means than the treadle may be devised for operating the links K K'.

The carrier H supports a suitable number of lock-out bars L for the keys that are designed for use in voting for separate offices or "scratching" party-tickets, the bars being mounted on the projections 6 and adapted to slide longitudinally, each bar coöperating with a horizontal row of keys, it being understood that each horizontal row of keys corresponds to a list of offices or candidates of the same order in all of the different tickets—that is to say, the keys in a row are coordinate, because of the party-tickets reading from the top downwardly in the usual order. Each bar L is formed as a thin oblong plate placed on edge, and in the lower edge thereof are recesses 23, the sides of which provide abutments 24 and 25, which perform the functions of projections in operation, but are formed as shown as a matter of economy, as will be obvious. There is a notch to clear each key employed, and each notch is sufficiently broad to permit the head $r$ to pass through, but not admitting the head F, except when the latter is turned on its pivot and being retracted with the key.

At the right-hand ends of the bars L a stationary stop member 26 is provided, on which a suitable number of latches 27 are mounted, as shown more particularly in Figs. 11 and 12, the latches having pivots 28 and rests 29 provided therefor, and it is designed that when the bars are not in operative positions the latches will be supported by the rests 29. When the bars L are elevated to operative positions, the latches will rest thereon and will drop behind the ends of the advanced bars L when they have been operated, thus preventing retraction of the bars.

The carrier H is provided at the rear thereof with bearings 30 and 31, attached to the top and the bottom rails, in which are pivoted swinging rack-bars M, having each an arm 32 at the top thereof extending forwardly beyond the pivot of the bar and a plurality of projections 33 at the lower portion thereof, for the purpose of simultaneously operating all the registers provided for a party-ticket when a straight ticket may have been voted by using one key alone.

The lock-out bar N has a suitable number of apertures 34, one for each key employed, and is part of the form of an open rectangular frame, the bottom of the frame being suitably supported, so as to permit horizontal movements only of the frame carrying the bar longitudinally at the front of the bar I. An arm 35 is attached to the frame, and thereby operatively connected with the bar N, the arm extending across the left-hand ends of the bars L.

A retractor O (formerly termed a "follower") is suitably mounted movably at the outer side of the arm 35, normally engaging the same, and it is pressed by a spring 36 and connected with bell-cranks 37, which are connected by a link 38 to the lever J for withdrawing the retractor from the arm to permit operation of the bars I, L, and N.

At the rear of the lock-out mechanism beyond the heads of the operating-keys in all sections of the machine toothed key-wheels P are rotatively mounted and operatively connected with suitable registers Q, the wheels being the medium of communication between the keys and the registers.

In the lower portion of the section that is arranged below the bead $a$ and at the right of the bead $c$ is another set of lock-out mechanism, as previously referred to, for coördinate voting and also for voting "for" and "against" measures, this mechanism being arranged below the line Z' and illustrated in detail particularly in the lower sections of Figs. 5, 7, 10, 13, 16, 19, and 20, and partially in Figs. 47, 48, 49, and 50, and will now be fully described. A carrier S is provided for supporting the lock-out bars and the limiting-bars, and it is supported on levers $J^2$ $J^3$ (similar to the levers J J', previously described,) which are connected to the links K K' and controlled thereby. The carrier comprises rear vertical bars 69, having projections 70 and front bars 71, parallel to the bars 69, and is provided with projections 72 at the bottom thereof. In the left-hand side of the carrier are a suitable number of lock-out bars L', designed to coöperate with the two vertical rows of keys $C^3$, each bar having two notches 23 to clear the two keys "for" and "against" arranged for each subject to be voted upon, the bars L' being mounted on projections 70 between the bars 69 and 71 and provided with a stationary stop-bar 73, having latches 27 mounted thereon to coöperate with the bars L', the latter having also the abutments 24 and 25. In the remaining parts of the carrier are a suitable number of lock-out bars L², mounted in the same manner as the bars L' on projections 70, each bar L² having but one notch 23, and therefore coöperating with but one key, there being two vertical rows of keys C⁴ shown for non-partisan candidates. Stops 74, 75, and 76, having latches 27, are provided for the bars L². A multiple retractor T is suitably mounted, so as to slide horizontally behind the carrier S, parallel thereto, and it comprises a rectangular frame having vertical lateral arms 77, 78, 79, and 80, the arm 77 being normally engaged by a retractor O', pressed by a spring 36 and connected to bell-cranks 37, suitably supported and connected by a link 38 to the lever J². The arm 77 coöperates with the bars L' and the arms 78, 79, and 80 with the bars L² for returning the bars to their normal positions after operation thereof by means of the retractor O'. At the front of the carrier T is a limiting-bar frame U, mounted slidingly on the projections 72 and having a plurality of notches 81 and also a set of multiple limiting-bars 82, having each a plurality of sets of notches 83, there being a set of notches for each operating-key provided, a set of notches corresponding in number to the number of notches 81 that may be provided, so that in the present case only three candidates may be voted for by each voter out of a greater number that may have been nominated, although, as indicated in Fig. 1, a greater number may be provided for. In the stop 76 are pin-holes 84 to receive a gage-pin 85 to coöperate with the frame U, so that the number of persons that may be voted for may be limited to two or one in setting the machine for use before opening the polls. For retracting the frame U and the limiting-bars after operation thereof a flexible cord 86 is connected to the frame and runs over a guide-pulley 87 to a spring-arm 88, to which it is attached, the arm being connected by a link 89 with the lever J³, whereby the arm may be elevated, so as to slack the cord in order to permit action of the frame U. A pawl 90 is suitably supported and coöperates with the notches 81 for preventing retraction of the frame U until the proper time for the movement to take place.

In the section of mechanism for multiple voting the interlocking devices are designed to act only when the keys in this section are operated, although the mechanism is designed to be set into operative position simultaneously with the other mechanisms. A carrier V, having the projections 4 and 5, is hung on a main operating and lock-out bar I', the projections normally bearing upon the bar, the latter having the recesses 10 and 11 to receive the projections and also having the arms 7 and 8 and the shoulders 12 and 13. On the lower portion of the carrier are a suitable number of projections 91, at the back part of which are seats 92 for supporting lock-out bars. The carrier is provided with vertical bars 93, having projections 94, and also with the projections 94 for supporting lock-out bars. The bar I' has a suitable number of notches 95 in its lower edge providing abutments 96 and 97, accommodating, as shown, four tickets, the keys C² for which are for the same office. Below the bar I' are three horizontal sets of lock-out bars L³ and L⁴, there being two bars in each of the two upper sets and four bars in the lower set, all the bars L³ having each a pair of notches 98, providing abutments 99 and 100, and the bars L⁴ having each only one notch 98 and two abutments 99 and 100, so that each bar having two notches coöperates with two keys and the other bars having a single notch coöperate with only one key. Immediately at the front of the bars L⁴, slidingly mounted on projections 91, is a limiting-bar 101, having four sets of notches 102, there being three notches in each set and opposite the notches 98 in the bars L⁴. At the front of the bars L³ on projections 91 are a pair of coupled limiting-bars 103 and 104, the bar 103 having four sets of notches 105 of two notches each and the bar 104 also having four sets of notches 106 of two notches to a set, all opposite the notches in the bars L³. Behind the carrier V a multiple retractor W is suitably supported, so as to slide horizontally parallel to the carrier, the retractor comprising a thin frame having lateral arms 107, 108, 109, and 110, the arm 107 being designed to be engaged by the retractor O², which is pressed by a spring 36 and connected with bell-cranks 37, the latter being connected by a link 38 with the lever J⁴. The arm 107 coöperates with the bars L³ in the left-hand side of the frame, the left side bar L⁴, and the bars 101 103 104. The arms 108, 109, and 110 coöperate with the remaining bars L³ and L⁴, as will be seen and understood from the preceding description of retractors. At the front of the carrier V is a frame X, comprising dual lock-out bars L⁹ and L¹⁰, the bar L⁹ having opposing abutments 111 and 112 and the bar L¹⁰ having opposing abutments 113 and 114, four pairs of abutments in each bar. An arm 115 is connected, by means of the frame, with the bars L⁹ and L¹⁰ and is designed to coöperate with the arm 107 and also with the adjacent ends of the limiting-bars and lock-out bars that are situated between the bar I' and the bar 101. At the front of the frame X is a frame Y, suitably supported so as to slide horizontally parallel to the carrier V, the frame comprising a set of triple lock-out bars L⁶ L⁷ L⁸, each bar having four pairs of opposing abutments 116 and 117. An arm 118 is connected, by means of the frame, with the lock-out bars and coöperates with the retractor O² and the adjacent end of a bar L⁴ and the bar 101. Suitable stops 119 and 120, having latches 27, are provided for the bars L³ and L⁴. The right-hand end of the bar 101 has notches 121, and the bar 104 has notches 122, the extremities of the bars also serving as notches adapted to be engaged by latches 123, mounted on the stop 120, these latches, however, being illustrated only in Fig. 27 and the notches therefor in Figs. 25, 26, 27, and 39.

The carriers are provided with suitable top and bottom stops, as 124 125 126 127, and also with side guides, as 128 129 130 131 132 133 134.

When mounting the registers with which the machines will be provided, it will be understood that suitable toothed wheels thereof—such, for example, as the key-wheels P—are to be so disposed that by slight movements of the bars M the projections 33 will be brought into engagement with the wheels, and thus by vertical movements of the bars M the registers connected therewith will be operated, the individual keys for a ticket not being required to be operated, thus saving much time when voting straight party-tickets.

In practical use the voter will approach the machine and necessarily stepping upon the treadle 20 the action will cause all of the carriers for the lock-out mechanism to be elevated, thus placing the machine in condition to be operated by means of the devices above described, the lock-out bars and the limiting-bars that are mounted on the carriers being elevated sufficiently to permit the operating-keys to pass into the notches in the bars to engage the registers, while the abutments at the sides of the notches may be engaged by the key-heads and the fins on the movable heads may enter the notch in the limiting-bars. While the carriers are rising the retractors O O' O² will move away from their normal positions and permit free movements of the lock-out bars and the limiting-bars. The operative positions of the mechanism are those seen particularly in Figs. 1, 5, 7, 16, 17, 18, 19, 21, 22, 23, 24, 25, 26, and 27. In Figs. 10 and 20 the carriers are depressed, and consequently the lock-out bars carried thereby are opposite to the inner ends of the keys, thus preventing the operation of the keys, the latter, however, being omitted in Fig. 10 in order to avoid obscuring the other members. The machine being ready for the voter to indicate his choice of candidates, if he decides to vote a straight party-ticket he will push in a key C at the head of the ticket of his choice, and in the movement of the key the main limiting-bars G will move, if required, so that the key-body alone may pass the end of a bar or between two bars, and thereby prevent the movement of any other key in the same horizontal row. The key-heads may freely enter the apertures 34 in the bar N. As the key moves the inclined face r' of the head r will engage the arm 32, which extends into the aperture 14, against the bar I at the left-hand side of the projection 15, pushing the arm 32 and the bar I toward the retractor O, thus swinging the bar M and placing the projections 33 in engagement with the register-wheels P for all of the candidates on the ticket, at the same time permitting the projections 4 and 5 to enter the recesses 10 and 11, the carrier H and the lock-out bars L descending, so that the bars L will be opposite the keys C' and prevent their operation, as shown in Fig. 17, and in this figure it will be seen that the middle key C has been operated and retracted, because the arm 32 still remains in contact with the bar I at the left-hand side of the projection 15, while the other arms 32 remain in their former positions, but now appear at the right-hand sides of the projections 15 by reason of the movement of the projections, the arms 32 of course having descended with the carrier H, while the bar I did not descend. It will also be seen that the bar I at the sides of the apertures 14 obstructs the movements of all the key-fingers v, thus preventing further voting in the same section on party-tickets. In the descent of the carrier H to its stop device the bar M is also moved downwardly, thus operating the registers with which the projections 33 engage. As the voter leaves the treadle 20 the levers J J' will tilt and permit the bar I to descend, and at the same time the retractor O will engage the shoulder 12 and force the bars I and M back to their normal positions, and the hood 16 will then prevent the operation of the keys C until the machine is again properly set for operation. If instead of voting a straight party-ticket the voter chooses to scratch or vote for different candidates on several tickets, he will not move any key C, but may operate any one key in all of the horizontal rows of keys C'. In Fig. 16 it is assumed that one key in the upper row of keys C' has been operated and retracted, the register corresponding thereto having been operated directly by the key, and that in the movement of the key inwardly the inclined face r' has engaged the abutment 24 at the side of a notch 23 and forced the lock-out bar L toward the retractor O, the abutments 25 now being opposite the fingers v of all the keys in the same horizontal row, thus preventing further operation of keys in that row, the latch 27 at the end of the bar L having dropped behind the bar to prevent its retraction while voting is being done. Further voting may proceed by operating any one of the remaining keys C' in each of the other horizontal rows of keys C', with the same results as in the case just described. When the first key C' is operated, the bar L moved thereby will engage the arm 35, and thus move the bar N toward the retractor O and opposite to the fingers v of all of the keys C, thus preventing the use of any key C for voting straight tickets after scratching has begun, as will be seen. As the voter leaves the treadle 20 the retractor O will return the bars N and L to their normal positions, the tilting of the levers J J' permitting the carrier H to depress the bars L below the latches 27. When the machine is again set for operation, the latches 27 will be lifted from their rests by the bars L and again be ready for action.

In operating the keys $C^3$ either one of the two keys in each horizontal row may be operated. The matter to be determined may be "for" or "against" any number of questions at issue, or the two vertical rows may be employed for selecting candidates from two nominated tickets, either for one or a number of offices. When one key $C^3$ is operated, a bar L' is moved to the left, as in Fig. 16, moving the arm 77 against the retractor O, and consequently the abutments 25 will be brought opposite to the fingers $v$ and further operation of keys in that horizontal row will be prevented, while similar operations may take place in the other horizontal rows. The bars L' will be returned by the retractor as the voter leaves the machine by the operations as previously described. The latches 27 will act as in the former case.

In the coördinate section when the carrier S is elevated to open the way for the operation of the keys $C^4$ and $C^5$ the cord 86 will be slackened, so that the bars 82 may be moved to the left. The illustrations indicate that only three candidates out of the group may be voted for. Now if a key $C^4$ in the upper horizontal row (at the left) be operated the bar $L^2$ (at the left) will be operated, as shown in Fig. 16, moving the arm 78, (if the same has not already been moved by the movement of the arm 77,) and the fin $w$, entering a notch 83, will move the bar 82, and consequently all of the bars 82, so that but two notches remain to be engaged in the whole set of bars 82. The pawl 90, as seen, has latched the frame U against retraction. The remaining two votes may be made either in the same horizontal row, including similar keys $C^5$ as the prior vote, or in the lower rows.

In the apparatus for multiple voting, previously referred to as being arranged in connection with State tickets and illustrated particularly in detached sections in Figs. 21 to 27 and in detail in other figures, provision is made for a voter to cast three ballots for the collective candidates for a certain office in States where minority candidates may be elected. In the present case, for illustration, there may be four tickets and one candidate on each ticket, all for the same office. There will be peculiar registers provided for this section of mechanism. The registers for the upper horizontal row of keys $C^2$ will each be capable of registering three votes with one operation of its key, and the registers for the two middle rows $C^6$ $C^7$ will each be designed to register one and one-half votes with one operation of its key, while the registers for the lower row $C^8$ will be ordinary, each registering one vote. On each ticket the candidate will appear in the four horizontal rows.

If the voter decides to give his three votes to one of the four party candidates whose names will be in the top row, one of the keys $C^2$ must be operated, and the result will be that the bar I' will be moved to the left by the face $r'$, the bar remaining opposite all of the keys $C^2$ and preventing further operations of keys in that row. The carrier V will descend, and thereby place the bars $L^3$ and $L^4$ opposite to the keys $C^6$ $C^7$ $C^8$, and thereby prevent their operation, as shown in Fig. 25. The bars 101 103 104 will also descend with the carrier.

In case the voter decides to give his three votes equally to two of the different candidates those entitled to receive them will also appear in the two middle horizontal rows with the keys $C^6$ $C^7$, and two of these keys may be operated for the purpose, accordingly as the voter may choose between the candidates, each of them to receive one and one-half votes. When one of the keys is operated, one of the bars $L^3$ and the bars 103 and 104 will be moved to the left by the key, leaving one notch 102 yet to be engaged. The other key that coöperates with the bar $L^3$ that has been operated of course will be locked out, and the next operation must take place with the use of a key coöperating with a different bar $L^3$, and when this has been done the bars 103 and 104 will have moved two spaces, leaving no more notches 102 open to the keys, and also the bars $L^9$ and $L^{10}$ together will have been moved across the ends of the remaining keys $C^2$ and $C^8$, thus locking them out from their registers, as in Fig. 26.

Should the voter prefer to give his possible three votes to the candidates of three of the four parties, the candidates also appearing in the lower horizontal row with the keys $C^8$, three of these keys will be operated, and consequently three of the bars $L^4$ and the bar 101 will be operated. In operating the first key the bar 101 will act on the arm 118, causing the bars $L^6$, $L^7$, and $L^8$ to move and lock out the keys $C^2$, $C^6$, and $C^7$, so that they cannot be operated, the bar 101 permitting only two more operations of keys $C^8$ in the lower horizontal row, the result of this manner of voting being illustrated in Fig. 27, in which it appears that two of the three votes have been cast, since the bar 101 may yet move until the latch 123 could fall behind the bar.

The operating-keys when normally at rest support the fingers $v$ at proper distances from the key-wheels P, the lock-out bars and the limiting-bars other than the bars G being between the two, the limiting-bars of course being only in certain sections, as described. When the lock-out bars are elevated so that the notches therein provide clear passages for the key-heads, the keys may be pushed through until the fingers $v$ engage and operate the key-wheels P of the register, which will be accomplished during the inward movements of the keys, while at the same time the inclined faces of the key-heads will be moving the lock-out bars toward the left. When a key has moved a sufficient distance for the purpose to a suitable stop and, being released by the operator, is being retracted by its spring, the head F will be turned on its pivot, as in Fig. 37, by the lock-out-bar abutment at the side of the head that is opposite to the pivot thereof, so that the finger $v$ will be disengaged from the key-wheel, and the key will then be fully retracted. When the key-head again becomes seated against the partition E or E', the heel of the head F in engagement with the partition will cause the head to swing back to its normal position with the finger in front of the abutment, so that the same key cannot be again operated by the same voter.

Minor devices that may readily be supplied by the ordinary mechanic are omitted in the description, and it is obvious that various modifications may fairly be made within the scope of the invention—such, for instance, as the omission of the fingers $v$ where the keys do not directly operate the registers.

Having thus described the invention, what I claim as new is—

1. A voting-machine provided with a plurality of registers, a plurality of keys having movable heads thereon adapted to operate the registers, and a plurality of movable lock-out members mounted in planes between the keys and the registers and coöperating with the movable heads.

2. A voting-machine provided with a plurality of registers, a plurality of keys provided with movable heads adapted to operate the registers and having fins thereon inclined to the axes of the keys, a plurality of lock-out members coöperating with the movable heads, and a plurality of limiting-bars having notches to receive the fins.

3. A voting-machine provided with a plurality of registers, a plurality of keys having heads adapted to operate the registers, and a plurality of movable lock-out members having each a plurality of pairs of abutments wherewith the heads may coöperate.

4. A voting-machine provided with a plurality of registers, a plurality of keys adapted to operate the registers, a plurality of vertically-movable and horizontally-movable lock-out members, latches disposed so as to engage the lock-out members, and a retractor adapted to actuate the lock-out members when the latches may have been disengaged therefrom.

5. A voting-machine provided with a plurality of registers, a main operating and lock-out bar combined, a carrier, swinging rack-bars mounted on the carrier and each adapted to be moved into operative engagement with a plurality of the registers, and a plurality of operating-keys coöperating with the rack-bars and the main operating and lock-out bar.

6. A voting-machine provided with a main operating and lock-out bar combined having apertures therein and provided with projections in the apertures, a carrier, a plurality of rack-bars mounted so as to swing in the carrier and having arms extending into the apertures at either side of the projections, a plurality of registers mounted within operative range of the rack-bars, and a plurality of operating-keys coöperating with the arms and also with the main operating and lock-out bar.

7. A voting-machine provided with a main operating and lock-out bar combined, a plurality of operating-keys having heads provided with inclined faces and coöperating during both operative and retractive movements with the main operating and lock-out bar, and a plurality of registers mounted within operative range of the keys.

8. A voting-machine provided with a plurality of registers, a plurality of operating-keys having movable heads for operating the registers, a plurality of lock-out bars displaced by the keys during operation thereof, and means coöperating with the movable heads and disengaging the same from the registers during retraction of the keys.

9. A voting-machine provided with a main operating and lock-out bar combined, a plurality of keys provided each with a movable head normally set for action and opposed by the main operating and lock-out bar, a plurality of registers, means whereby the main operating and lock-out bar may be moved vertically from opposition to the movable heads, arms whereby the keys may actuate the main operating and lock-out bar to move the same into the normal paths of the heads, means coöperating with the movable heads actuating the same during retraction of the keys, and a plurality of rack-bars operatively connected with the arms and each adapted to be moved into engagement with a plurality of the registers.

10. A voting-machine provided with a plurality of operating-keys having movable heads, a plurality of registers adapted to be engaged by the movable heads, a plurality of lock-out bars movable vertically and horizontally and operative horizontally by means of the movable heads and also adapted to operate the movable heads and disengage the same from the registers, a carrier supporting the lock-out bars whereby the same may be moved vertically, and latches coöperating with the lock-out bars.

11. A voting-machine provided with a plurality of registers, a plurality of operating-keys having movable heads for operating the registers, a plurality of lock-out bars displaced by the keys during operation thereof and coöperating to disengage the movable heads of the keys from the registers, and fixed stops coöperating to reset the movable heads of the keys during retraction of the keys.

12. A voting-machine including a plurality of registers arranged in vertical rows, individual operating-keys for the registers, a plurality of rack-bars supported in proximity to the registers and each adapted to engage a vertical row thereof, a carrier supporting all of the rack-bars, a plurality of main operating-keys for the rack-bars to connect the bars with the registers, and mechanism for causing the rack-bars to operate the registers controlled by the main operating-keys.

13. A voting-machine including a plurality of registers arranged in vertical rows, individual operating-keys for the registers, a vertically-movable carrier provided with a plurality of rack-bars having each an arm and adapted to engage a row of the registers, a combined main operating and lock-out bar supporting the carrier and coöperating with the arms of the rack-bars, and a plurality of main operating-keys coöperating with the main operating and lock-out bar and also with the arms of the rack-bars.

14. A voting-machine provided with a plurality of registers, a plurality of operating-keys having movable heads for engaging and operating the registers, and lock-out bars for the operating-keys coöperating to disengage the movable heads thereof from the registers.

15. A voting-machine provided with a plurality of registers, a plurality of operating-keys for the registers arranged in series, and a plurality of main limiting-bars coöperating with a series of the operating-keys collectively and each one of the bars also adapted to coöperate separately with two adjacent keys in the series thereof.

16. A voting-machine provided with a plurality of registers, a plurality of operating-keys for the registers, a plurality of series of lock-out bars for the keys having a plurality of bars in the series, and a retractor-frame having a plurality of arms adapted to actuate the plurality of lock-out bars.

17. A voting-machine provided with a plurality of registers, a plurality of operating-keys for the registers, a carrier provided with a plurality of series of lock-out bars having a plurality of bars in each series, a plurality of coupled limiting-bars coöperating with the lock-out bars collectively and mounted on the carrier, and a movable support for the carrier.

18. A voting-machine including a main operating and lock-out bar having apertures therein provided with hoods, a carrier supported by the main operating and lock-out bar provided with a plurality of swinging rack-bars having arms extending into the apertures at the rear of the hoods, a plurality of registers adapted to be engaged by the rack-bars, a plurality of individual operating-keys for the registers, and a plurality of main operating-keys adapted to enter the apertures and engage the arms of the rack-bars and thereby operate the main operating and lock-out bar.

19. A voting-machine provided with a plurality of registers having a plurality of operating-keys therefor provided each with a movable head having a projecting finger at one side thereof and an inclined face at the opposite side thereof, and a plurality of lock-out bars having opposing abutments one of which may be engaged by an inclined face of the head during operation of a key and the other one of which may be engaged by the movable head for operation thereof during retraction of the key after operation thereof.

20. A voting-machine provided with a plurality of operating-keys having each a movable head provided with a fin at one side thereof and a projecting finger at the opposite side thereof, a plurality of registers adapted to be operated by the fingers of the keys, a plurality of lock-out bars, and a limiting-bar having a plurality of notches to receive the fins of the heads whereby to operate the limiting-bar and thereby limit the operation of the keys to predetermined numbers.

21. A voting-machine provided with a main operating and lock-out bar combined having apertures therein provided with projections extending into the apertures, hoods extending permanently across the upper portions of the apertures above the projections therein, a carrier supported by the main operating and lock-out bar, a plurality of registers, a plurality of operating-keys opposite the apertures, a plurality of movable rack-bars mounted in the carrier adapted to operate a plurality of the registers and having arms extending into the apertures above the projections therein in range of the operating-keys, a plurality of operating-keys opposite the registers and having lock-out bars therefor supported by the carrier, and means whereby the carrier may be elevated and depressed.

22. A voting-machine provided with a plurality of operating-keys, a plurality of registers, a plurality of lock-out bars for the operating-keys, a fixed stop for the lock-out bars provided with latches coöperating with the lock-out bars, and a retractor for the lock-out bars.

23. A voting-machine provided with a plurality of registers, a plurality of operating-keys for the registers having movable heads, a plurality of lock-out bars coöperating with the keys, a plurality of horizontal plates, a plurality of main limiting-bars mounted on the plates, a partition partially supporting the keys and also the limiting-bars and engaged by the heads of the keys, and supporting-guides for the limiting-bars opposite to the partition.

24. A voting-machine provided with a carrier, a main operating and lock-out bar supporting the carrier and movably supported, a plurality of rows of lock-out bars having a plurality of bars in each row mounted on the carrier, a plurality of registers, a plurality of operating-keys for the registers, a plurality of limiting-bars mounted on the carrier adjacent to the lock-out bars, one for each row thereof, a pair of frames of coupled lock-out bars coöperating with the plurality of lock-out bars, and a multiple retractor for coöperating with the plurality of lock-out bars.

25. A voting-machine provided with a plurality of limiting-bars rigidly coupled together provided each with a plurality of sets of notches comprising a plurality of notches each, a plurality of registers, a carrier supporting the limiting-bars, a plurality of operating-keys for the registers provided with fins adapted to enter the notches in the limiting-bars and operate the same, a plurality of lock-out bars mounted on the carrier, latches for the lock-out bars, adjustable limiting devices for the coupled limiting-bars, and retractors for the lock-out bars and the limiting-bars.

26. A voting-machine including a plurality of registers each provided with a toothed key-wheel, a plurality of operating-keys for the registers having fingers situated opposite to the peripheries of the key-wheels, vertically-moving lock-outs opposing the keys, horizontally-moving lock-outs opposing the fingers, a carrier for the lock-outs, stops for the lock-outs, and means whereby the carrier may be actuated.

27. A voting-machine including a carrier, a plurality of registers, a plurality of operating-keys for the registers, a plurality of lock-out bars for the keys mounted on the carrier, a plurality of latches for the lock-out bars, means whereby the carrier may be depressed so as to disengage the lock-out bars from the latches, and a retractor operating against the lock-out bars immediately after release thereof from the latches.

28. A voting-machine provided with a sliding frame including a plurality of coupled limiting-bars provided each with a plurality of sets of notches having a plurality of notches each, an adjustable gage for the frame, a retractor for the frame, a pawl for latching the frame, a plurality of vote-registers, a plurality of operating-keys for the registers having fins adapted to enter the notches and operate the bars, and a separate lock-out bar for each operating-key.

29. A voting-machine including vertically-movable supports, a carrier carried by the supports, a plurality of coupled limiting-bars mounted on the carrier so as to move in unison and provided each with a plurality of sets of notches having a plurality of notches each, an adjustable gage for the limiting-bars collectively, a retractor for the limiting-bars collectively, a plurality of vote-registers, a plurality of operating-keys for the registers having each a movable head provided with a fin adapted to operate in the notches of the limiting-bars, lock-out bars coöperating with the keys, and a retractor for the lock-out bars.

30. A voting-machine provided with a movable carrier, a plurality of vote-registers, a plurality of operating-keys for the registers, a plurality of movable rack-bars each adapted to engage a plurality of the registers for the simultaneous operation thereof, a plurality of operating-keys adapted to move the rack-bars into engagement with the registers, and means whereby the carrier may be actuated and thereby operate the registers engaged by a rack-bar independently of the operating-keys for the registers.

31. A voting-machine provided with a movable main operating-bar having therein a plurality of apertures, a carrier mounted on the main operating-bar and provided with a plurality of movable rack-bars having each a plurality of projections and having also an arm extending into an aperture in the operating-bar, a plurality of sets of vote-registers adapted to be engaged and operated in sets by the projections, a plurality of sets of operating-keys for the registers adapted to separately operate the registers independently of the rack-bars, a plurality of operating-keys for engaging the arms of the rack-bars whereby to place the projections in engagement with the registers and also to operate the main operating-bar and thereby cause the operation of a set of registers, and interlocking lock-out mechanism coöperating with the operating-keys.

32. A voting-machine including vertically-movable supports, an operating and lock-out bar movable horizontally on the movable supports, a carrier supported by the operating and lock-out bar, a plurality of registers, a plurality of operating-keys for the registers, lock-out bars mounted on the carrier, limiting-bars mounted on the carrier, and independently-movable lock-out bars supported independently of the carrier and coöperating with the operating-keys and also with the lock-out bars and the limiting-bars that are mounted on the carrier.

33. A voting-machine including vertically-movable supports, an operating and lock-out bar movable horizontally on the movable supports, a carrier supported by the operating and lock-out bar, a plurality of registers, a plurality of operating-keys for the registers, a plurality of groups of lock-out bars carried by the carrier and each bar of each group movable independently, a plurality of limiting-bars carried by the carrier and movable together, an independently-movable limiting-bar supported also by the carrier, and a plurality of lock-out bars supported independently of the carrier and movable together in coöperation with the carrier and the lock-out bars and the limiting-bars carried thereby.

34. A voting-machine including a plurality of registers, a plurality of operating-keys for the registers, lock-out bars for the keys, a carrier supporting the lock-out bars and provided with a plurality of movable rack-bars each adapted to engage a plurality of the registers and having an arm attached thereto, a combined main operating-bar and lock-out bar movably supported and supporting the carrier and provided with apertures in which the arms of the rack-bars coöperate therewith, operating-keys for the rack-bars coöperating with the arms thereof, and lock-out members adapted to be moved between the arms of the rack-bars and the operating-keys therefor.

35. A voting-machine including a plurality of registers, a plurality of keys for the registers, a carrier movably supported, a plurality of lock-out bars mounted on the carrier and adapted to be operated thereby and also by the operating-keys, limiting-bars adapted to be operated by the operating-keys, and lock-out mechanism adapted to be operated by the limiting-bars.

36. A voting-machine including vertically-movable supports, a carrier supported by the supports, a plurality of registers, a plurality of operating-keys for the registers, a plurality of lock-out bars for the operating-keys mounted on the carrier, a plurality of movable latches for the lock-out bars, rests normally supporting the latches above the lock-out bars, means coöperating to operate the movable supports and thereby elevate the carrier and the lock-out bars so as to pick up the latches from their supports, means coöperating to operate the movable supports and thereby depress the carrier and move the lock-out bars to planes below the normal positions of the latches, and a retractor for returning the lock-out bars under the latches coöperating with the means that coöperate to depress the carrier.

37. A voting-machine including a plurality of registers, a plurality of operating-keys for the registers, a plurality of lock-out bars for the keys, a plurality of limiting-bars operative together by either one of the keys, a pawl for latching the limiting-bars collectively, latches for the lock-out bars, and a retractor for the lock-out bars having a plurality of arms adapted to engage and return the lock-out bars after operation thereof to normal positions.

38. A voting-machine including a plurality of series of vote-registers, a plurality of series of operating devices for the vote-registers, a plurality of carriers, a plurality of connected members for supporting and operating the carriers, a main operating-bar, a plurality of independent lock-out bars for the operating devices, a plurality of series of lock-out bars for the operating devices, retractors for the lock-out bars, a multiple register-operating means, and a plurality of inflexible limiting-bars for series of the operating devices for the registers.

39. A voting-machine including a plurality of registers arranged in series, a plurality of operating-keys for the registers arranged in series, a carrier, a movable main operating and lock-out bar movably supporting the carrier, a plurality of series of separate lock-out bars coöperating with the operating-keys, a plurality of limiting-bars coöperating with the operating-keys, and a plurality of frames of coupled lock-out bars coöperating with the operating-keys.

40. A voting-machine including a plurality of registers arranged in vertical rows, a plurality of operating-keys for the registers, a carrier provided with pivotal bearings, rackbars pivoted in the bearings and having each a plurality of projections adapted to engage and operate a plurality of the registers, independent operating devices for the rack-bars, means whereby the carrier may be moved for operating the registers by means of the rack-bars, and lock-out mechanism for the operating-keys of the registers.

41. In a voting-machine, the combination with a plurality of registers, a plurality of operating devices for the registers, and a plurality of lock-out bars for the operating devices, of fixed stops for the lock-out bars, pawls coöperating with the lock-out bars, and means whereby the operative connection of the pawls with the lock-out bars may be severed.

42. In a voting-machine, the combination with a carrier, a plurality of registers, a plurality of operating-keys for the registers, a plurality of lock-out bars for the operating-keys coöperating therewith, a retractor for the lock-out bars, and means whereby the lock-out bars may be elevated and depressed, of a plurality of pawls supported in planes above the lock-out bars when depressed and coöperating therewith when elevated and operated by the keys.

43. In a voting-machine, the combination with a vertically-movable carrier having projections, a plurality of registers, a plurality of operating-keys, and a plurality of independent lock-out bars for the operating-keys mounted on the projections, of a plurality of limiting-bars coupled rigidly together and mounted movably on the carrier horizontally, means whereby the operating-keys may engage and operate the limiting-bars during operation of the registers, the limiting-bars collectively restricting the operation of the keys collectively to a predetermined number of operations.

44. In a voting-machine, the combination with a carrier, a plurality of registers, a plurality of operating-keys for the registers, and a plurality of lock-out bars for the keys supported by the carrier, of a retractor comprising a frame provided with a plurality of lateral arms coöperating with the lock-out bars, and pawls coöperating with the lock-out bars independently of the retractor.

45. In a voting-machine, the combination with a plurality of registers having toothed wheels, a plurality of lock-out bars, and a retractor for the lock-out bars, of a plurality of operating-keys for the registers provided each with a movable head for operating the toothed wheels of the registers, the head having a fin thereon inclined to the longitudinal axis of the key-body, and a plurality of limiting-bars coupled rigidly together and movably supported provided with a plurality of sets of notches to receive the fins of the key-heads whereby to operate the bars simultaneously.

46. In a voting-machine, the combination with a keyboard, and a plurality of registers, of a partition providing supports for operating keys behind the keyboard, and a plurality of operating-keys mounted in the keyboard and in the partition-supports, each key having a movable head coöperating with the partition and provided with a finger for operating a register.

47. In a voting-machine, the combination with a plurality of horizontal rows of registers, a plurality of horizontal rows of operating-keys for the registers, an independent horizontal row of operating-keys, and interlocking lock-out mechanism for the operating-keys collectively, of a plurality of movable rack-bars coöperating with the keys in the independent horizontal row of keys and adapted to be placed in operative engagement with the registers, each rack-bar being adapted to operate a plurality of registers simultaneously, and means whereby the rack-bars may be operated to operate the registers.

48. In a voting-machine, the combination with a set of simple registers arranged in a horizontal row, a plurality of sets of multiplying-registers arranged in horizontal rows, and operating-keys for the registers, of a main operating and lock-out bar coöperating with the operating-keys of one of the sets of multiplying-registers and supporting a carrier, a plurality of sets of lock-out bars on the carrier coöperating with the operating-keys of a plurality of sets of multiplying-registers, a plurality of independent lock-out bars on the carrier coöperating with the operating-keys of the set of simple registers, a muliple retractor for the lock-out bars collectively, means for supporting and elevating and depressing the main operating and lock-out bar, a pair of limiting-bars on the carrier coöperating with the plurality of sets of lock-out bars and also with the corresponding operating-keys, a limiting-bar on the carrier coöperating with the independent lock-out bars and also with the corresponding operating-keys, pawls for the lock-out bars, pawls for the limiting-bars, a pair of coupled movable lock-out bars coöperating with the keys of one of the sets of multiplying-registers and also with the keys of the set of simple registers, and a triple set of coupled movable lock-out bars coöperating with the keys of the several sets of multiplying-registers, means whereby the pair and the triple set of lock-out bars may be operated by the lock-out bars of different sets, and retractors for the pair and triple lock-out bars.

49. In a voting-machine, the combination with a plurality of registers, a plurality of operating-keys for the registers, lock-out bars for the operating-keys, a carrier provided with a plurality of rack-bars each adapted to engage a plurality of the registers, a plurality of operating-keys coöperating with the rack-bars, and a combined main operating and lock-out bar supporting the carrier and coöperating with the rack-bars and also with the keys therefor.

50. In a voting-machine, the combination with a plurality of registers, of a plurality of operating-keys for the registers having each a fixed head provided with a movable member pivoted at a side of its center to the fixed head at a side of its center, and an operative lock-out bar moved by the advance movement of either one of the operating-keys and coöperating to move the movable member of the fixed head during retracting movements of the operating-key.

51. In a voting-machine, the combination with a plurality of registers, and a plurality of operating-keys for the registers, of a vertically-movable carrier, and a plurality of lock-out bars for the keys mounted on the carrier for coördinate voting, there being a bar for each key coöperating therewith independently so that the key shall move the bar during advance to its register and leave it in position to prevent a second advance movement after retraction of the key, a plurality of coupled limiting-bars coöperating collectively with the operating-keys, and an adjustable gage for the limiting-bars collectively.

52. In a voting-machine, the combination with a plurality of registers, a plurality of operating-keys for the registers, and a movable carrier, of a plurality of lock-out bars for the keys mounted on the carrier, there being a bar coöperating with a horizontal row of keys, two pairs of bars of which each pair coöperates with a horizontal row of keys, and a plurality of shorter bars of which each bar coöperates with a single key in a horizontal row of keys, a pair of coupled limiting-bars movable together, a single independently-movable limiting-bar, a group of three lock-out bars movable together, and a pair of lock-out bars movable together.

53. In a voting-machine, the combination with a plurality of registers, a plurality of series of operating-keys for the registers, and a movable carrier, of a plurality of lock-out bars mounted on the carrier and comprising a single bar coöperating with a series of the keys, a plurality of bars each coöperating with a plurality of the keys in a separate series thereof, a plurality of bars each coöperating with a plurality of the keys in a separate series thereof, and a plurality of bars coöperating with a separate series of keys, there being a bar for each key of the series, limiting-bars mounted on the carrier, and lock-out bars supported independently of the carrier and coöperating each with a series of the operating-keys.

54. In a voting-machine, the combination with a plurality of registers, a plurality of series of operating-keys for the registers, and a carrier, of a plurality of lock-out bars mounted on the carrier, a plurality of limiting-bars mounted on the carrier, and a plurality of groups of movable lock-out bars supported independently of the carrier, the lock-out bars and the limiting-bars coöperating with the operating-keys, and each group of lock-out bars being movable together.

In testimony whereof I affix my signature in presence of two witnesses.

CLEMENT DE CROES.

Witnesses:
 WM. H. PAYNE,
 E. T. SILVIUS.